United States Patent
Iwashita et al.

(10) Patent No.: US 11,492,471 B2
(45) Date of Patent: Nov. 8, 2022

(54) POLYPROPYLENE RESIN COMPOSITION AND MONOLAYER AND MULTILAYER FILM

(71) Applicant: MITSUI CHEMICALS, INC., Tokyo (JP)

(72) Inventors: Akihiko Iwashita, Tokyo (JP); Shigeyuki Yasui, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 9 days.

(21) Appl. No.: 16/316,585

(22) PCT Filed: Jul. 18, 2017

(86) PCT No.: PCT/JP2017/025857
§ 371 (c)(1),
(2) Date: Jan. 9, 2019

(87) PCT Pub. No.: WO2018/016460
PCT Pub. Date: Jan. 25, 2018

(65) Prior Publication Data
US 2019/0300688 A1   Oct. 3, 2019

(30) Foreign Application Priority Data

Jul. 21, 2016  (JP) .............. JP2016-143416

(51) Int. Cl.
| | | |
|---|---|---|
| C08L 23/12 | (2006.01) | |
| C08L 23/14 | (2006.01) | |
| C08F 210/06 | (2006.01) | |
| B32B 15/085 | (2006.01) | |
| B32B 27/32 | (2006.01) | |
| C08F 222/02 | (2006.01) | |
| C08F 222/06 | (2006.01) | |
| B65D 65/00 | (2006.01) | |
| C08L 23/26 | (2006.01) | |
| H01M 50/10 | (2021.01) | |

(52) U.S. Cl.
CPC ............ *C08L 23/12* (2013.01); *B32B 15/085* (2013.01); *B32B 27/32* (2013.01); *B65D 65/00* (2013.01); *C08F 210/06* (2013.01); *C08F 222/02* (2013.01); *C08F 222/06* (2013.01); *C08L 23/147* (2013.01); *C08L 23/26* (2013.01); *H01M 50/10* (2021.01); *B32B 2250/03* (2013.01); *B32B 2307/306* (2013.01); *B32B 2439/70* (2013.01); *C08L 2203/16* (2013.01); *C08L 2207/12* (2013.01); *C08L 2314/06* (2013.01); *Y02W 90/10* (2015.05)

(58) Field of Classification Search
CPC ....... B32B 15/085; B32B 27/32; B32B 23/14; B32B 23/12; B32B 23/26; B32B 23/147; B32B 23/142; B32B 23/16; B32B 51/06; B32B 2307/302; B32B 2439/70; B32B 2250/03; B32B 2307/306; B32B 27/08; B65D 65/00; C08L 23/142; C08L 23/12; C08L 23/26; C08L 23/147; C08L 2203/16; C08L 2207/12; C08L 2314/06; C08L 23/14; C08L 23/145; H01M 2/02; H01M 50/10; C08F 222/06; C08F 210/06; C08F 222/02; C08F 10/06; C08F 2500/12; C08F 2500/26; Y02W 90/11; Y02W 90/10; Y02E 60/10; Y02A 40/90; C08J 5/18

See application file for complete search history.

(56) References Cited

U.S. PATENT DOCUMENTS

| | | |
|---|---|---|
| 4,812,526 A | 3/1989 | Rifi |
| 4,960,878 A | 10/1990 | Crapo et al. |
| 5,321,106 A | 6/1994 | LaPointe |
| 5,591,817 A | 1/1997 | Asanuma et al. |
| 5,695,838 A | 12/1997 | Tanaka et al. |
| 5,759,469 A | 6/1998 | Asanuma et al. |
| 6,034,162 A | 3/2000 | Mizutani et al. |
| 6,271,310 B1 | 8/2001 | Okayama et al. |
| 6,939,928 B1 | 9/2005 | Kawai et al. |

(Continued)

FOREIGN PATENT DOCUMENTS

| | | |
|---|---|---|
| EP | 1 900 758 A1 | 3/2008 |
| EP | 2 048 194 A1 | 4/2009 |

(Continued)

OTHER PUBLICATIONS

Extended European Search Report dated Feb. 14, 2020 for corresponding Application No. 17830977.9.

(Continued)

Primary Examiner — Irina S Zemel
(74) Attorney, Agent, or Firm — Foley & Lardner LLP

(57) ABSTRACT

A propylene polymer satisfying (a) below, a soft propylene copolymer satisfying (b) below, and a polyolefin containing a structural unit derived from an unsaturated carboxylic acid and/or a derivative thereof, wherein (a) a melting point is 100° C. or more, and (b) an MFR is in the range of 0.01 to 100 g/10 min, at least one of the following requirements (b-1) and (b-2) is satisfied: (b-1) a syndiotactic triad fraction s 60% or more, and (b-2) a structural unit derived from propylene is 55 to 90 mol % and a structural unit derived from at least one olefin having 2 to 20 carbon atoms (excluding propylene) is contained at 10 to 45 mol % (with provisos), and the relation between an intrinsic viscosity $[\eta]$ (dL/g) and the MFR satisfies the relation: $1.50 \times MFR^{-0.20} \leq [\eta] \leq 2.65 \times MFR^{-0.20}$.

12 Claims, No Drawings

(56) References Cited

U.S. PATENT DOCUMENTS

| | | | |
|---|---|---|---|
| 7,863,368 B2 | 1/2011 | Hoya | |
| 8,101,684 B2 | 1/2012 | Hoya | |
| 8,329,821 B2 | 12/2012 | Kurita et al. | |
| 8,445,582 B2 | 5/2013 | Yasui et al. | |
| 9,290,649 B2 | 3/2016 | Tranninger et al. | |
| 2005/0228155 A1 | 10/2005 | Kawai et al. | |
| 2006/0020086 A1 | 1/2006 | Smith | |
| 2006/0161013 A1 | 7/2006 | Tohi et al. | |
| 2006/0276607 A1 | 12/2006 | Ikenaga et al. | |
| 2008/0292896 A1 | 11/2008 | Ikenaga et al. | |
| 2008/0306219 A1 | 12/2008 | Ikenaga et al. | |
| 2008/0306234 A1 | 12/2008 | Ikenaga et al. | |
| 2008/0312461 A1 | 12/2008 | Ikenaga et al. | |
| 2009/0043050 A1 | 2/2009 | Ikenaga et al. | |
| 2009/0317649 A1 | 12/2009 | Smith | |
| 2010/0000600 A1 | 1/2010 | Hoya | |
| 2010/0015426 A1 | 1/2010 | Smith | |
| 2010/0056691 A1* | 3/2010 | Hoya | C08L 23/142 524/424 |
| 2010/0063198 A1 | 3/2010 | Yasui et al. | |
| 2011/0196103 A1 | 8/2011 | Kawahara et al. | |
| 2012/0064317 A1 | 3/2012 | Smith | |
| 2012/0328754 A1 | 12/2012 | Campanelli et al. | |
| 2014/0199505 A1* | 7/2014 | Lorenzetti et al. | B32B 7/02 428/34.2 |
| 2014/0357771 A1 | 12/2014 | Tranninger et al. | |
| 2015/0368432 A1 | 12/2015 | Smith | |
| 2016/0136860 A1 | 5/2016 | Smith | |
| 2017/0018744 A1 | 1/2017 | Ogihara et al. | |

FOREIGN PATENT DOCUMENTS

| | | |
|---|---|---|
| EP | 2 080 784 A1 | 7/2009 |
| EP | 2 573 134 A1 | 3/2013 |
| JP | S64-54045 A | 3/1989 |
| JP | H01-501950 A | 7/1989 |
| JP | H04-300933 A | 10/1992 |
| JP | H06-263936 A | 9/1994 |
| JP | H09-111069 A | 4/1997 |
| JP | H10-330558 A | 12/1998 |
| JP | H11-77925 A | 3/1999 |
| JP | 2001-114819 A | 4/2001 |
| JP | 2002-097325 A | 4/2002 |
| JP | 2002-321324 A | 11/2002 |
| JP | 2007-273398 A | 10/2007 |
| JP | 2012-126829 A | 7/2012 |
| JP | 2012-132024 A | 7/2012 |
| JP | 2013-237861 A | 11/2013 |
| JP | 2014-221913 A | 11/2014 |
| JP | 2015-228387 A | 12/2015 |
| JP | 2015-230777 A | 12/2015 |
| KR | 944817 B1 | 6/1994 |
| KR | 20090126254 A | 12/2009 |
| WO | WO-88/05792 A1 | 8/1988 |
| WO | WO-98/46677 A1 | 10/1998 |
| WO | WO-01/27124 A1 | 4/2001 |
| WO | WO-2004/026913 A2 | 4/2004 |
| WO | WO-2004/029062 A1 | 4/2004 |
| WO | WO-2004/087775 A1 | 10/2004 |
| WO | WO-2005066266 A1 * | 7/2005 ............. B32B 15/08 |
| WO | WO-2008/093805 A1 | 8/2008 |
| WO | WO-2009/137401 A1 | 11/2009 |
| WO | WO-2015/152397 A1 | 10/2015 |

OTHER PUBLICATIONS

Korean Office Action dated Oct. 29, 2019 for corresponding Application No. 10-2018-7037593.

Indian Office Action dated Jan. 9, 2020 for corresponding Application No. 201917006003.

International Searching Authority, "International Search Report," issued in connection with International Patent Application No. PCT/JP2017/025857, dated Sep. 26, 2017.

International Searching Authority, "Written Opinion," issued in connection with International Patent Application No. PCT/JP2017/025857, dated Sep. 26, 2017.

* cited by examiner

POLYPROPYLENE RESIN COMPOSITION AND MONOLAYER AND MULTILAYER FILM

RELATED APPLICATIONS

The present application claims priority under 37 U.S.C. § 371 to International Patent Application No. PCT/JP2017/025857, filed Jul. 18, 2017, which claims priority to and the benefit of Japanese Patent Application No. 2016-143416, filed on Jul. 21, 2016. The contents of these applications are hereby incorporated by reference in their entireties.

TECHNICAL FIELD

The present invention relates to polypropylene resin compositions, monolayer films, and multilayer films, and more specifically relates to monolayer films and multilayer films suitably used in packaging materials for food products, construction materials, packaging materials for lithium ion batteries, and the like and a polypropylene resin composition contained in these films.

BACKGROUND ART

Conventionally, polypropylene has been widely used as a thermoplastic molding material having high rigidity, heat resistance, transparency and the like. Such polypropylene is a non-polar material, which has poor adhesiveness to a polar material such as an ethylene vinyl alcohol copolymer. To improve the adhesiveness, a technique of modifying polypropylene with an unsaturated carboxylic acid or a derivative thereof has been widely known. Because polypropylene also has inferior flexibility, a soft rubber component is usually compounded with polypropylene when used as an adhesive.

Such compounding of a soft rubber component with polypropylene yields a polypropylene-based adhesive having improved adhesiveness (for example, Patent Literature 1 and Patent Literature 2). On the other hand, the soft rubber component causes whitening during secondary processings such as deep drawing and bending, and therefore an improvement in whitening resistance has been required. In particular, example of specific applications needed for deep drawing and bending include packaging materials for food products, construction materials, and packaging materials for lithium ion batteries.

Among these applications, use of the lithium ion batteries has been spread in the fields of portable electronic devices, automobiles, etc. Furthermore, to meet the freedom in shape and a size reduction in lithium ion batteries, use of pouch-type and emboss-type packaging comprising multilayer films has been spread. Such a packaging material comprising a multilayer film comprises at least a substrate layer, a metal foil layer, a thermally sealable resin layer, and an adhesive layer which bonds two adjacent layers among these three layers. Although the multilayer film has high freedom in shape, and therefore is easy to process during production of packages of a pouch-type or emboss-type, the deformed portions of the multilayer film may be whitened during deformation. Because whitened portions of the packaging material cause short circuit, a material having high whitening resistance has been demanded.

Patent Literature 3 describes a packaging material for a battery comprising a laminate of a substrate layer, a metal foil layer including a chemically treated layer on at least one surface thereof, an acid-modified polyolefin layer, and a sealant layer composed of a high melting point polypropylene layer and an ethylene•propylene random copolymer layer, these layers being at least sequentially disposed, wherein the high melting point polypropylene layer is disposed closer to the metal foil layer than the ethylene•propylene random copolymer layer is, and the melting point is 150° C. or more. In the packaging material for a battery, the high melting point polypropylene layer having a melting point of 150° C. or more is disposed closer to the metal foil layer than the ethylene•propylene random copolymer layer is. For this reason, even if the temperature of the inside of a battery is increased by overcharge or the like, the high melting point polypropylene layer does not melt, enabling prevention of the contact between the metal terminal and the metal foil layer and thus generation of internal short circuit. Unfortunately, sufficient whitening resistance cannot be expected in this packaging material for a battery.

Patent Literature 4 describes a polypropylene resin composition for a battery packaging film comprising a propylene-ethylene block copolymer (A) comprising a propylene polymer component (A1) and a propylene-ethylene random copolymer component (A2), the propylene-ethylene block copolymer (A) being prepared through multi-stage polymerization and satisfying specific conditions such as the content of ethylene. According to the description of this patent literature, the film formed of this composition has high heat resistance, sealing performance, and molding properties, has high sealing strength and impact resistance, and has an effect of improving whitening resistance and crack resistance during deformation processing in a good balance. Unfortunately, actually, the required level of whitening resistance has not been achieved yet.

CITATION LIST

Patent Literature

Patent Literature 1: Japanese Patent Laid-Open No. 9-111069

Patent Literature 2: Japanese Patent Laid-Open No. 4-300933

Patent Literature 3: Japanese Patent Laid-Open No. 2007-273398

Patent Literature 4: Japanese Patent Laid-Open No. 2015-230777

SUMMARY OF INVENTION

Technical Problem

In consideration of such problems, an object of the present invention is to provide a packaging material having high whitening resistance during deformation processing and usable in packaging materials for food products, construction materials, packages for lithium ion batteries, and the like, particularly to provide a packaging material which can be produced by molding methods such as co-extrusion, (co-)extrusion coating and lamination, and is barely whitened during molding at high speed.

Solution to Problem

To achieve the above object, the present invention is a polypropylene resin composition comprising:
a propylene polymer (A) satisfying the following requirement (a);
a soft propylene copolymer (B) satisfying the following requirement (b); and
a polyolefin (C) containing a structural unit derived from an unsaturated carboxylic acid and/or a derivative thereof.
(a) a melting point observed by differential scanning calorimetry is 100° C. or more.
(b) an MFR measured at 230° C. and a load of 2.16 kg according to ASTM D-1238 is in the range of 0.01 to 100 g/10 min, and at least one of the following requirements (b-1) and (b-2) is satisfied.
(b-1) a syndiotactic triad fraction (rr fraction) measured by $^{13}$C-NMR is 60% or more.
(b-2) a structural unit derived from propylene is contained at 55 to 90 mol % and a structural unit derived from at least one olefin selected from α-olefins having 2 to 20 carbon atoms (excluding propylene) is contained at 10 to 45 mol % (provided that a the total of the structural unit derived from propylene and the structural unit derived from α-olefins having 2 to 20 carbon atoms (excluding propylene) is 100 mol %), and relation between a intrinsic viscosity [$\eta$] (dL/g) measured at 135° C. in decalin and the MFR (g/10 min, 230° C., load: 2.16 kg) satisfies the relation represented by an expression:

$$1.50 \times MFR^{-0.20} \leq [\eta] \leq 2.65 \times MFR^{-0.20}.$$

Preferably, the polypropylene resin composition comprises
50 to 85 parts by mass of the propylene polymer (A),
5 to 40 parts by mass of the soft propylene copolymer (B), and
0.1 to 10 parts by mass of the polyolefin (C) (provided that a total of (A), (B), and (C) is 100 parts by mass).

In the polypropylene resin composition, the polyolefin (C) contains 0.01 to 5% by mass of the structural unit derived from the unsaturated carboxylic acid in terms of a structural unit derived from maleic anhydride, and further, in the polyolefin (C), the content proportion of the structural unit derived from propylene in the structural units excluding the structural unit derived from the unsaturated carboxylic acid is 90 to 100 mol %.

The monolayer film or multilayer film according to the present invention comprises at least one layer comprising the polypropylene resin composition.

One aspect of the multilayer film according to the present invention can include a multilayer film comprising at least one layer comprising the polypropylene resin composition, and at least two other layers different from the layer comprising the composition, wherein both surfaces of the layer comprising the composition are in contact with the other layers.

One aspect of the multilayer film according to the present invention can include a multilayer film comprising at least one layer comprising the polypropylene resin composition and at least one layer selected from a metal containing layer, a polyolefin layer, and a polar resin layer, wherein the layer comprising the composition is in contact with at least one layer of the metal containing layer, the polyolefin layer, and the polar resin layer.

The monolayer film or multilayer film according to the present invention can be used as packaging materials for food products, construction materials, and a film for battery packaging.

The monolayer film or multilayer film according to the present invention is produced by melt extrusion molding of the above-described polypropylene resin composition.

Advantageous Effects of Invention

A monolayer film or multilayer film comprising a layer formed of the polypropylene resin composition according to the present invention has high whitening resistance during deformation processing, and can be suitably used as packaging materials for food products, construction materials, and packaging materials for lithium ion batteries and the like. Moreover, the monolayer film or multilayer film also exhibits good whitening resistance during deformation processing or deep drawing at high speed.

DESCRIPTION OF EMBODIMENTS

The polypropylene resin composition according to the present invention comprises a propylene polymer (A), a soft propylene copolymer (B), and a polyolefin (C) containing a structural unit derived from an unsaturated carboxylic acid and/or a derivative thereof.

Propylene Polymer (A)

Examples of the propylene polymer (A) can include propylene homopolymers, or copolymers of propylene and at least one α-olefin having 2 to 20 carbon atoms excluding propylene. Here, examples of the α-olefins having 2 to 20 carbon atoms excluding propylene include ethylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. Preferred is ethylene or α-olefins having 4 to 10 carbon atoms.

The copolymer of propylene and these α-olefins may be random copolymers, or may be block copolymers. The structural units derived from these α-olefins can be contained in a proportion of 35 mol % or less, preferably 30 mol % or less in the copolymer of the α-olefins and propylene.

The propylene polymer (A) satisfies the following requirement (a).
(a) The melting point observed by differential scanning calorimetry is 100° C. or more.

The melting point is preferably 100 to 170° C., more preferably 110 to 165° C.

The propylene polymer (A) desirably has a melt flow rate (MFR) in the range of 0.01 to 1000 g/10 min, preferably 0.05 to 100 g/10 min observed at 230° C. and a load of 2.16 kg according to ASTM D 1238.

The propylene polymer (A) may have any of an isotactic structure and a syndiotactic structure. As described later, one of these structures can be selected in consideration of the compatibility with the soft propylene copolymer (B).

In other words, examples of the form of the propylene polymer (A) include an isotactic propylene polymer (A1) and a syndiotactic propylene polymer (A2).

Examples of the isotactic propylene polymer (A1) include homopolypropylenes having high heat resistance, such as homopolypropylenes usually known to contain 3 mol % or less of a copolymerization component other than propylene; polypropylene impact copolymers having a good balance between the heat resistance and the flexibility, such as polypropylene impact copolymers usually known to contain 3 to 30% by mass of a normal decane-elutable rubber component; and random polypropylenes having a good balance between the flexibility and the transparency, such as random polypropylenes known to have a melt peak in the range of 100° C. or more, preferably 110° C. to 150° C. measured with a differential scanning calorimeter DSC. The isotactic propylene polymer (A1) can be appropriately selected from these polypropylene components to attain the target physical properties, or two or more of the polypropylene components having different melting points and different rigidities can be used in combination.

Such an isotactic propylene polymer (A1) can be produced, for example, through polymerization of propylene or copolymerization of propylene and other α-olefin in the presence of a Ziegler catalyst system containing a solid catalyst component containing magnesium, titanium, halogen, and an electron donor as essential components, an organic aluminum compound, and an electron donor or a metallocene catalyst system using a metallocene compound as one component of the catalyst.

The syndiotactic propylene polymer (A2) contains 90 mol % or more of a structural unit derived from propylene, and 10 mol % or less of a structural unit derived from at least one member selected from ethylene and α-olefins having 4 to 20 carbon atoms. The syndiotactic propylene polymer (A2) preferably contains 91 mol % or more of the structural unit derived from propylene, and 9 mol % or less of the structural unit derived from at least one member selected from ethylene and α-olefins having 4 to 20 carbon atoms (provided that a total of these structural units is 100 mol %).

Examples of the α-olefins having 4 to 20 carbon atoms include ethylene, 1-butene, 3-methyl-1-butene, 1-pentene, 1-hexene, 4-methyl-1-pentene, 1-octene, 1-decene, 1-dodecene, 1-tetradecene, 1-hexadecene, 1-octadecene, and 1-eicosene.

The syndiotactic propylene polymer (A2) preferably satisfies both of the following requirements [1] and [2].

[1] The syndiotactic pentad fraction (rrrr fraction, pentad syndiotacticity) measured by $^{13}$C-NMR is 85% or more.

[2] The melting point (Tm) determined with a differential scanning calorimeter (hereinafter, referred to as DSC) is 100° C. or more.

Hereinafter, the requirements [1] and [2] will be specifically described.

Requirement [1]

The rrrr fraction of the syndiotactic propylene polymer (A2) measured by $^{13}$C-NMR is 85% or more, preferably 90% or more, more preferably 93% or more, still more preferably 94% or more. A polymer (A2) having an rrrr fraction in this range is preferred because the polymer has high molding properties, heat resistance, transparency, and rigidity and shows good properties as crystalline polypropylene. Such a polymer (A2) having an rrrr fraction in this range can be produced by using a catalyst system as described later and setting the polymerization condition as described later. The upper limit of the rrrr fraction can be any value. The upper limit is 100% or less, usually 99% or less, for example.

The rrrr fraction is measured as follows.

The rrrr fraction can be determined from the absorption intensity Prrrr (absorption intensity derived from the methyl group of the third unit in the syndiotactic bonding site of five continuous propylene units) and the absorption intensity Pw (absorption intensity derived from all the methyl groups in the propylene units) in a $^{13}$C-NMR spectrum from the following expression (1):

$$rrrr\ \text{fraction} = Prrrr/Pw \quad (1)$$

NMR measurement is performed as follows. A sample (0.35 g) is dissolved in hexachlorobutadiene (2.0 mL) by heating. This solution is filtered through a glass filter (G2), and deuterated benzene (0.5 mL) is added thereinto. The solution is placed into an NMR tube having an inner diameter of 10 mm. A GX-500 NMR analyzer made by JEOL, Ltd. is then used to perform $^{13}$C-NMR measurement at 120° C. The number of accumulation is 10,000 times or more.

Requirement [2]

The syndiotactic propylene polymer (A2) preferably has a higher melting point (Tm) determined by differential scanning calorimetry (DSC). Specifically, the melting point (Tm) is more preferably 156° C. or more, 155° C. or more, 150° C. or more, 147° C. or more, 145° C. or more, 115° C. or more, 100° C. or more in this order. The upper limit of the melting point (Tm) can be any value. The upper limit thereof is usually 170° C.

Furthermore, the syndiotactic propylene polymer (A2) preferably has a larger enthalpy of melting (ΔH), which is measured at the same time as the measurement of the melting point (Tm). Specifically, the enthalpy of melting is more preferably 55 mJ/mg or more, 52 mJ/mg or more, 40 mJ/mg or more, 20 mJ/mg or more, 10 mJ/mg or more in this order. The upper limit of the enthalpy of melting (ΔH) can be any value. The enthalpy of melting is usually 120 mJ/mg, for example.

Differential scanning calorimetry is performed as follows, for example. A sample (about 5 mg) is placed into a dedicated aluminum pan. Using DSCPyris1 or DSC7 made by PerkinElmer Inc., the aluminum pan is heated from 30° C. to 200° C. at 320° C./min and kept at 200° C. for five minutes. The aluminum pan is then cooled from 200° C. to 30° C. at 10° C./min, and is kept at 30° C. for another five minutes, followed by heating at 10° C./min. From the endothermic curve at this time, the melting point is determined. If a plurality of peaks are detected in the measurement of DSC, the temperature of the peak detected at the highest temperature is defined as the melting point (Tm). A polymer (A2) having a melting point (Tm) in this range is preferred because such a crystalline polypropylene has high molding properties, heat resistance and mechanical properties. Such a polymer (A2) having a melting point (Tm) in this range can be produced by using a catalyst system as described later and setting the polymerization condition as described later.

The syndiotactic propylene polymer (A2) preferably satisfies the following requirement [3] in addition to the requirements [1] and [2].

[3] The normal decane-soluble fraction content is 1% by mass or less.

Hereinafter, the requirement [3] will be specifically described.

Requirement [3]

The normal decane-soluble fraction content in the syndiotactic propylene polymer (A2) is 1% by mass or less, preferably 0.8% by mass or less, more preferably 0.6% by mass or less. The normal decane-soluble fraction content is an index closely related with the blocking properties of the syndiotactic propylene polymer or a molded product obtained from the polymer. Usually, a low normal decane-soluble fraction content indicates a small amount of a low crystalline component. In other words, the syndiotactic propylene polymer (A2) also satisfying the requirement [3] has significantly high blocking resistance.

The n-decane soluble fraction and its monomer composition can be determined as follows.

After a sample is dissolved in n-decane by heating, the sample is left to stand and cooled to room temperature. The component dissolved in n-decane in this state is defined as an n-decane soluble fraction. To analyze the monomer composition of the n-decane soluble fraction, the following method is used: Acetone is mixed with the solution to precipitate the polymer component, and the IR of the resulting polymer is measured.

The syndiotactic propylene polymer (A2) preferably also satisfies the following requirements [4] to [7].

[4] The tensile elastic modulus is in the range of 150 to 2000 MPa.

[5] The tensile breaking strength is 15 MPa or more.

[6] The internal haze value of a press sheet having a thickness of 1 mm is 50% or less.

[7] The needle penetrating temperature is 100° C. or more.

Hereinafter, the requirements [4] to [7] will be described in detail.

Requirement [4]

The syndiotactic propylene polymer (A2) has a tensile elastic modulus of 150 MPa to 2000 MPa, preferably 300 MPa to 1800 MPa, more preferably 500 MPa to 1500 MPa.

Specifically, the tensile elastic modulus is the value measured according to the following procedure. A press sheet having a thickness of 1 mm is punched out for a JIS No. 3 dumbbell according to JIS K6301, and is fed as a sample for evaluation. The measurement is performed three times using a tensile tester Inston 1123 made by Instron Corporation at an interval between spans of 30 mm at a tensile rate of 30 ram/min and 23° C. The average of the three measured values is used as a tensile elastic modulus.

A syndiotactic propylene polymer (A2) having a tensile elastic modulus in this range is preferred because it has high mechanical properties and strength and shows good properties as crystalline polypropylene. A polymer (A2) having a tensile elastic modulus in this range can be produced by using a catalyst system as described later and setting a polymerization condition as described later.

Requirement [5]

The syndiotactic propylene polymer (A2) has a tensile breaking strength of 15 MPa or more, preferably 18 MPa or more, more preferably 20 MPa or more, still more preferably 30 MPa or more.

Specifically, the tensile breaking strength is a value measured according to the following procedure. A press sheet having a thickness of 1 mm is punched out for a JIS No. 3 dumbbell according to JIS K6301, and is fed as a sample for evaluation. The measurement is performed three times using a tensile tester Inston 1123 made by Instron Corporation at an interval between spans of 30 mm and a tensile rate of 30 ram/min and 23° C. The average of the three measured values is used as a tensile breaking strength.

A syndiotactic propylene polymer (A2) having a tensile breaking strength in this range is preferred because it shows good properties as crystalline polypropylene. Such a polymer (A2) having a tensile breaking strength in this range can be produced by using a catalyst system as described later and setting a polymerization condition as described later.

Requirement [6]

A press sheet made of the syndiotactic propylene polymer (A2) and having a thickness of 1 mm has an internal haze of 50% or less, preferably 45% or less.

The value of the internal haze is the average of the two measured values when a test piece formed of a press sheet having a thickness of 1 mm is measured two times with a digital turbidity meter "NDH-20D" made by Nippon Denshoku Industries Co., Ltd.

A syndiotactic propylene polymer (A2) having an internal haze in this range is preferred because it has high transparency and shows good properties as crystalline polypropylene. Such a polymer (A2) having an internal haze in this range can be produced by using a catalyst system as described later and setting a polymerization condition as described later.

Requirement [7]

The syndiotactic propylene polymer (A2) has a needle penetrating temperature in the range of 100° C. or more, preferably 115° C. or more. The needle penetrating temperature (also referred to as softening point determined from the TMA measurement in some cases) can be measured as follows.

Using SS-120 made by Seiko Instruments Inc. or Q-400 made by TA Instrument, a pressure of 2 kgf/cm$^2$ is applied from a plane indenter having 1.8 mmφ to a test piece formed of a press sheet having a thickness of 1 mm at a heating rate of 5° C./min. From the TMA curve, the needle penetrating temperature (° C.) is determined.

A syndiotactic propylene polymer (A2) having a needle penetrating temperature in this range is preferred because it has high heat resistance and shows good properties as crystalline polypropylene. Such a polymer (A2) having a needle penetrating temperature in this range can be produced by using a catalyst system as described later and setting a polymerization condition as described later.

Where the isothermal crystallization temperature determined by differential scanning calorimetry (DSC) is defined as Tiso and the crystallization half-time at the isothermal crystallization temperature Tiso is defined as $t_{1/2}$, the syndiotactic propylene polymer (A2), in the range of 110≤Tiso≤150 (° C.), satisfies the relation represented by the following expression (Eq-1):

[Math. 1]

$$1.67 \times 10^{-4} \exp(0.10 \times T_{iso}) \leq t_{1/2} \leq 5.56 \times 10^{-4} \exp(0.12 \times T_{iso}) \quad \text{(Eq-1)}$$

preferably satisfies the relation represented by the following expression (Eq-2):

[Math. 2]

$$1.67 \times 10^{-4} \exp(0.10 \times T_{iso}) \leq t_{1/2} \leq 3.71 \times 10^{-4} \exp(0.12 \times T_{iso}) \quad \text{(Eq-2)}$$

more preferably satisfies the relation represented by the following expression (Eq-3).

[Math. 3]

$$1.67 \times 10^{-4} \exp(0.10 \times T_{iso}) \leq t_{1/2} \leq 2.23 \times 10^{-4} \exp(0.12 \times T_{iso}) \quad \text{(Eq-3)}$$

The crystallization half-time ($t_{1/2}$) determined from the measurement of isothermal crystallization is the time when a sample reaches a 50% enthalpy of the total enthalpy during the process of isothermal crystallization where the area between the DSC calorimetric curve and the base line is defined as the total enthalpy. [see Shinkoubunsi Jikkenkouza 8: Koubunshino Bussei (Kyoritsu Shuppan Co., Ltd)]

The crystallization half-time ($t_{1/2}$) is measured as follows. A sample (about 5 mg) is placed into a dedicated aluminum pan. Using DSCPyrisl or DSC7 made by PerkinElmer Inc., the aluminum pan is heated from 30° C. to 200° C. at 320° C./min and kept at 200° C. for five minutes. The aluminum pan is cooled from the temperature (200° C.) to the respective isothermal crystallization temperatures at 320° C./min. From the DSC curve produced when the sample is kept at the isothermal crystallization temperature, the crystallization half-time ($t_{1/2}$) is determined. Here, the crystallization half-time ($t_{1/2}$) is determined as a starting time of the isothermal crystallization process (time when the sample reaches the isothermal crystallization temperature from 200° C.) t=0. The crystallization half-time $t_{1/2}$ of the syndiotactic propylene polymer (A2) used in the present invention can be determined as described above. If the sample does not crystallize at an isothermal crystallization temperature, for example, 110° C., for convenience, the sample is measured at several isothermal crystallization temperatures equal to or lower than 110° C., and the crystallization half-time ($t_{1/2}$) is determined from the extrapolated value of the measured value.

A syndiotactic propylene polymer (A2) satisfying the relation represented by the above expression (Eq-1) has significantly higher molding properties than those of conventional syndiotactic propylene polymers. Here, the term "has high molding properties" indicates that melting to solidification of a polymer when molding such as injection, inflation, blowing, extrusion, or press is completed in a short time. Moreover, such a syndiotactic propylene polymer (A2) has high molding cycle properties, shape stability, and long-term productivity.

Catalysts used in production of the syndiotactic propylene polymer (A2) are a catalyst (cat-1) for polymerization composed of
a crosslinked metallocene compound (K) represented by the following formula [1], and
at least one or more compounds (L) selected from an organic aluminum oxy compound (L1),
a compound (L2) reactive with the crosslinked metallocene compound (K) to form an ion pair, and
an organic aluminum compound (L3);
or a catalyst (cat-2) for polymerization comprising the catalyst (cat-1) carried on a particulate carrier (P). Any catalyst can be used as long as the resulting polymer satisfies the requirements for the component or propylene polymer (A).

[Chem.1]

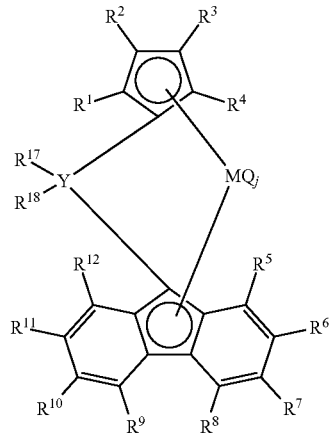

[1]

In the formula [1], $R^1$, $R^2$, $R^3$, and $R^4$ are selected form a hydrogen atom, a hydrocarbon group, and a silicon containing group; $R^2$ and $R^3$ may be bonded to each other to form a ring; $R^5$, $R^6$, $R^8$, $R^9$, $R^{11}$, and $R^{12}$ are selected from hydrogen, a hydrocarbon group, and a silicon containing group; two groups of $R^7$ and $R^{10}$ are not a hydrogen atom, are selected from a hydrocarbon group and a silicon containing group, and may be the same or different; and in at least one combination of adjacent groups selected from $R^5$ and $R^6$, $R^7$ and $R^8$, $R^8$ and $R^9$, $R^9$ and $R^{10}$, and $R^{11}$ and $R^{12}$, the adjacent groups may be bonded to each other to form a ring.

$R^{17}$ and $R^{18}$ are a hydrogen atom, a hydrocarbon group having 1 to 20 carbon atoms, or a silicon atom containing group, and may be the same or different; and these substituents may be bonded to each other to form a ring.

M is Ti, Zr, or Hf; Y is carbon; Q is a combination identical or different groups selected from halogen, a hydrocarbon group, an anion ligand, and a neutral ligand having a lone pair allowing coordination; and j is an integer of 1 to 4.

Specific examples of the compound (K) satisfying this definition can include:
cyclopropylidene(cyclopentadienyl) (3,6-di-tert-fluorenyl) zirconium dichloride,
cyclobutylidene(cyclopentadienyl) (3,6-di-tert-fluorenyl) zirconium dichloride,
cyclopentylidene(cyclopentadienyl) (3,6-di-tert-fluorenyl) zirconium dichloride,
cyclohexylidene(cyclopentadienyl) (3,6-di-tert-fluorenyl) zirconium dichloride,
cycloheptylidene(cyclopentadienyl) (3,6-di-tert-fluorenyl) zirconium dichloride,
dibenzylmethylene(cyclopentadienyl) (3,6-di-tert-butylfluorenyl)zirconium dichloride,
dibenzylmethylene(cyclopentadienyl) (octamethyloctahydrodibenzofluorenyl)zirconium dichloride, di-n-butylmethylene(cyclopentadienyl) (2,7-dimethyl-3,6-di-tert-butylfluorenyl)zirconium dichloride, di-n-butylmethylene (cyclopentadienyl(2,7-di-(2,4,6-trimethylphenyl)-3,6-di-tert-butylfluorenyl)zirconium dichloride, di-n-butylmethylene(cyclopentadienyl) (2,7-diphenyl-3,6-di-tert-butylfluorenyl)zirconium dichloride, di-n-butylmethylene(cyclopentadienyl) (2,7-di(3,5-dimethylphenyl)-3,6-di-tert-butylfluorenyl)zirconium dichloride, di-n-butylmethylene(cyclopentadienyl) (2,3,6,7-tetra-tert-butylfluorenyl)zirconium dichloride, di-n-butylmethylene(cyclopentadienyl) (2,7-di-(4-methylphenyl)-3,6-di-tert-butylfluorenyl)zirconium dichloride, di-n-butylmethylene(cyclopentadienyl) (2,7-dinaphthyl-3,6-di-tert-butylfluorenyl)zirconium dichloride, di-n-butylmethylene(cyclopentadienyl) (2,7-di-(4-tert-butylphenyl)-3,6-di-tert-butylfluorenyl)zirconium dichloride,
diisobutylmethylene(cyclopentadienyl) (2,7-dimethyl-3,6-di-tert-butylfluorenyl)zirconium dichloride,
diisobutylmethylene(cyclopentadienyl (2,7-di-(2,4,6-trimethylphenyl)-3,6-di-tert-butylfluorenyl)zirconium dichloride, diisobutylmethylene(cyclopentadienyl) (2,7-diphenyl-3,6-di-tert-butylfluorenyl)zirconium dichloride, diisobutylmethylene(cyclopentadienyl) (2,7-di-(3,5-dimethylphenyl)-3,6-di-tert-butylfluorenyl)zirconium dichloride, diisobutylmethylene(cyclopentadienyl) (2,3,6,7-tetra-tert-butylfluorenyl)zirconium dichloride, diisobutylmethylene(cyclopentadienyl) (2,7-di-(4-methylphenyl)-3,6-di-tert-butylfluorenyl)zirconium dichloride, diisobutylmethylene(cyclopentadienyl) (2,7-dinaphthyl-3,6-di-tert-butylfluorenyl)zirconium dichloride, diisobutylmethylene(cyclopentadienyl) (2,7-di-(4-tert-butylphenyl)-3,6-di-tert-butylfluorenyl)zirconium dichloride,
dibenzylmethylene(cyclopentadienyl) (2,7-dimethyl-3,6-di-tert-butylfluorenyl)zirconium dichloride [also referred to as 1,3-diphenylisopropylidene(cyclopentadienyl) (2,7-dimethyl-3,6-di-tert-butylfluorenyl)zirconium dichloride. Hereinafter, alternative names are omitted.],
dibenzylmethylene (cyclopentadienyl (2,7-di-(2,4,6-trimethylphenyl)-3,6-di-tert-butylfluorenyl) zirconium dichloride, dibenzylmethylene(cyclopentadienyl) (2,7-diphenyl-3,6-di-tert-butylfluorenyl)zirconium dichloride,
dibenzylmethylene(cyclopentadienyl) (2,7-di-(3,5-dimethylphenyl)-3,6-di-tert-butylfluorenyl)zirconium dichloride, dibenzylmethylene(cyclopentadienyl) (2,3,6,7-tetra-tert-butylfluorenyl)zirconium dichloride,
dibenzylmethylene(cyclopentadienyl) (2,7-di-(4-methylphenyl)-3,6-di-tert-butylfluorenyl)zirconium dichloride,
dibenzylmethylene(cyclopentadienyl) (2,7-dinaphthyl-3,6-di-tert-butylfluorenyl)zirconium dichloride,
dibenzylmethylene(cyclopentadienyl) (2,7-di-(4-tert-butylphenyl)-3,6-di-tert-butylfluorenyl)zirconium dichloride,
diphenethylmethylene(cyclopentadienyl) (2,7-dimethyl-3,6-di-tert-butylfluorenyl)zirconium dichloride,
diphenethylmethylene(cyclopentadienyl) (2,7-diphenyl-3,6-di-tert-butylfluorenyl)zirconium dichloride, di-(benzhydryl)methylene(cyclopentadienyl) (2,7-dimethyl-3,6-di-tert-butylfluorenyl)zirconium dichloride, di-(benzhydryl)methylene(cyclopentadienyl) (2,7-diphenyl-3,6-di-tert-butylfluorenyl)zirconium dichloride, di-(cumyl)methylene(cyclopentadienyl) (2,7-dimethyl-3,6-di-tert-butylfluorenyl)zirconium dichloride, di-(cumyl)methylene(cyclopentadienyl) (2,7-diphenyl-3,6-di-tert-butylfluorenyl)zirconium dichloride, di-(1-phenyl-ethyl)methylene(cyclopentadienyl) (2,7-dimethyl-3,6-di-tert-butylfluorenyl)zirconium dichloride, di-(1-phenyl-ethyl)methylene(cyclopentadienyl) (2,7-diphenyl-3,6-di-tert-butylfluorenyl)zirconium dichloride, di-(cyclohexylmethyl)methylene(cyclopentadienyl) (2,7-dimethyl-3,6-di-tert-butylfluorenyl)zirconium dichloride, di-(cyclohexylmethyl)methylene(cyclopentadienyl) (2,7-diphenyl-3,6-di-tert-butylfluorenyl)zirconium dichloride, di-(cyclopentylmethyl)methylene(cyclopentadienyl) (2,7-dimethyl-3,6-di-tert-butylfluorenyl)zirconium dichloride, di-(cyclopentylmethyl)methylene(cyclopentadienyl) (2,7-diphenyl-3,6-di-tert-butylfluorenyl)zirconium dichloride, di-(naphthylmethyl)methylene(cyclopentadienyl) (2,7-dimethyl-3,6-di-tert-butylfluorenyl)zirconium dichloride, di-(naphthylmethyl)methylene(cyclopentadienyl) (2,7-diphenyl-3,6-di-tert-butylfluorenyl)zirconium dichloride, di-(biphenylmethyl)methylene(cyclopentadienyl) (2,7-dimethyl-3,6-di-tert-butylfluorenyl)zirconium dichloride, di-(biphenylmethyl)methylene(cyclopentadienyl) (2,7-diphenyl-3,6-di-tert-butylfluorenyl)zirconium dichloride,
(benzyl) (n-butyl)methylene(cyclopentadienyl) (2,7-dimethyl-3,6-di-tert-butylfluorenyl)zirconium dichloride,
(benzyl) (n-butyl)methylene(cyclopentadienyl) (2,7-diphenyl-3,6-di-tert-butylfluorenyl)zirconium dichloride,
(benzyl) (cumyl)methylene(cyclopentadienyl) (2,7-dimethyl-3,6-di-tert-butylfluorenyl)zirconium dichloride,
(benzyl) (cumyl)methylene(cyclopentadienyl) (2,7-diphenyl-3,6-di-tert-butylfluorenyl)zirconium dichloride,
cyclopropylidene(cyclopentadienyl) (2,7-dimethyl-3,6-di-tert-butylfluorenyl)zirconium dichloride,
cyclopropylidene(cyclopentadienyl) (2,7-diphenyl-3,6-di-tert-butylfluorenyl)zirconium dichloride,
cyclobutylidene(cyclopentadienyl) (2,7-dimethyl-3,6-di-tert-butylfluorenyl)zirconium dichloride,
cyclobutylidene(cyclopentadienyl) (2,7-diphenyl-3,6-di-tert-butylfluorenyl)zirconium dichloride,
cyclopentylidene(cyclopentadienyl) (2,7-dimethyl-3,6-di-tert-butylfluorenyl)zirconium dichloride,
cyclopentylidene(cyclopentadienyl) (2,7-diphenyl-3,6-di-tert-butylfluorenyl)zirconium dichloride,
cyclohexylidene(cyclopentadienyl) (2,7-dimethyl-3,6-di-tert-butylfluorenyl)zirconium dichloride,
cyclohexylidene(cyclopentadienyl) (2,7-diphenyl-3,6-di-tert-butylfluorenyl)zirconium dichloride,
cycloheptylidene(cyclopentadienyl) (2,7-dimethyl-3,6-di-tert-butylfluorenyl)zirconium dichloride,
cycloheptylidene(cyclopentadienyl) (2,7-diphenyl-3,6-di-tert-butylfluorenyl)zirconium dichloride,
dibenzylmethylene(cyclopentadienyl) (2,7-dimethyl-3,6-dimethyl-butylfluorenyl)zirconium dichloride, di-n-butylmethylene(cyclopentadienyl) (2,7-dimethyl-3,6-dimethyl-butylfluorenyl)zirconium dichloride,
dibenzylmethylene(cyclopentadienyl) (2,7-dimethyl-3,6-dicumyl-butylfluorenyl)zirconium dichloride, di-n-butylmethylene(cyclopentadienyl) (2,7-dimethyl-3,6-dicumyl-butylfluorenyl)zirconium dichloride,
dibenzylmethylene(cyclopentadienyl) (2,7-dimethyl-3,6-di-(trimethylsilyl)-butylfluorenyl)zirconium dichloride, di-n-butylmethylene(cyclopentadienyl) (2,7-dimethyl-3,6-di-(trimethylsilyl)-butylfluorenyl)zirconium dichloride,
dibenzylmethylene(cyclopentadienyl) (2,7-dimethyl-3,6-diphenyl-butylfluorenyl)zirconium dichloride, di-n-butylmethylene(cyclopentadienyl) (2,7-dimethyl-3,6-diphenyl-butylfluorenyl)zirconium dichloride,
dibenzylmethylene(cyclopentadienyl) (2,7-dimethyl-3,6-dibenzyl-butylfluorenyl)zirconium dichloride, di-n-butylmethylene(cyclopentadienyl) (2,7-dimethyl-3,6-dibenzyl-butylfluorenyl)zirconium dichloride,
dibenzylmethylene(cyclopentadienyl) (2,7-dimethyl-3,6-dimethyl-butylfluorenyl)zirconium dichloride, di-n-butylmethylene(cyclopentadienyl) (2,7-dimethyl-3,6-dimethyl-butylfluorenyl)zirconium dichloride,
diphenylmethylene(cyclopentadienyl) (2,7-dimethyl-3,6-di-tert-butylfluorenyl)zirconium dichloride, diphenylmethylene(cyclopentadienyl) (2,7-diphenyl-3,6-di-tert-butylfluorenyl)zirconium dichloride, di-(p-tolyl)methylene(cyclopentadienyl) (2,7-dimethyl-3,6-di-tert-butylfluorenyl)zirconium dichloride, di-(p-tolyl)methylene(cyclopentadienyl) (2,7-diphenyl-3,6-di-tert-butylfluorenyl)zirconium dichloride, di-(p-chlorophenyl)methylene(cyclopentadienyl) (2,7-dimethyl-3,6-di-tert-butylfluorenyl)zirconium dichloride, di-(p-chlorophenyl)methylene(cyclopentadienyl) (2,7-diphenyl-3,6-di-tert-butylfluorenyl)zirconium dichloride, di-(m-chlorophenyl)methylene(cyclopentadienyl) (2,7-dimethyl-3,6-di-tert-butylfluorenyl)zirconium dichloride, di-(m-chlorophenyl)methylene(cyclopentadienyl) (2,7-diphenyl-3,6-di-tert-butylfluorenyl)zirconium dichloride, di-(p-bromophenyl)methylene(cyclopentadienyl) (2,7-dimethyl-3,6-di-tert-butylfluorenyl)zirconium dichloride, di-(p-bromophenyl)methylene(cyclopentadienyl) (2,7-diphenyl-3,6-di-tert-butylfluorenyl)zirconium dichloride, di-(m-trifluoromethyl-phenyl)methylene(cyclopentadienyl) (2,7-dimethyl-3,6-di-tert-butylfluorenyl)zirconium dichloride, di-(m-trifluoromethyl-phenyl)methylene(cyclopentadienyl) (2,7-diphenyl-3,6-di-tert-butylfluorenyl)zirconium dichloride, di-(p-trifluoromethyl-phenyl)methylene(cyclopentadienyl) (2,7-dimethyl-3,6-di-tert-butylfluorenyl)zirconium dichloride, di-(p-trifluoromethyl-phenyl)methylene(cyclopentadienyl) (2,7-diphenyl-3,6-di-tert-butylfluorenyl)zirconium dichloride, di-(p-tert-butyl-phenyl)methylene(cyclopentadienyl) (2,7-dimethyl-3,6-di-tert-butylfluorenyl)zirconium dichloride, di-(p-tert-butyl-phenyl)methylene(cyclopentadienyl) (2,7-diphenyl-3,6-di-tert-butylfluorenyl) zirconium dichloride, di-(p-n-butyl-phenyl)methylene (cyclopentadienyl) (2,7-dimethyl-3,6-di-tert-butylfluorenyl)zirconium dichloride, di-(p-n-butyl-phenyl)methylene(cyclopentadienyl) (2,7-diphenyl-3,6-di-tert-butylfluorenyl)zirconium dichloride,
di-(p-biphenyl)methylene(cyclopentadienyl) (2,7-dimethyl-3,6-di-tert-butylfluorenyl)zirconium dichloride, di-(p-biphenyl)methylene(cyclopentadienyl) (2,7-diphenyl-3,6-di-tert-butylfluorenyl)zirconium dichloride, di-(1-naphthyl)methylene(cyclopentadienyl) (2,7-dimethyl-3,6-di-tert-butylfluorenyl)zirconium dichloride, di-(1-naphthyl)methylene(cyclopentadienyl) (2,7-diphenyl-3,6-di-tert-butylfluorenyl)zirconium dichloride, di-(2-naphthyl)methylene(cyclopentadienyl) (2,7-dimethyl-3,6-di-tert-butylfluorenyl)zirconium dichloride, di-(2-naphthyl)methylene(cyclopentadienyl) (2,7-diphenyl-3,6-di-tert-butylfluorenyl)zirconium dichloride, di-(naphthylmethyl)methylene(cyclopentadienyl) (2,7-dimethyl-3,6-di-tert-butylfluorenyl)zirconium dichloride, di-(naphthylmethyl)methylene(cyclopentadienyl) (2,7-diphenyl-3,6-di-tert-butylfluorenyl)zirconium dichloride, di-(p-isopropylphenyl)methylene(cyclopentadienyl) (2,7-dimethyl-3,6-di-tert-butylfluorenyl)zirconium dichloride, di-(p-isopropylphenyl)methylene(cyclopentadienyl) (2,7-diphenyl-3,6-di-tert-butylfluorenyl)zirconium dichloride, di-(biphenylmethyl)methylene(cyclopentadienyl) (2,7-dimethyl-3,6-di-tert-butylfluorenyl)zirconium dichloride, di-(biphenylmethyl)methylene(cyclopentadienyl) (2,7-diphenyl-3,6-di-tert-butylfluorenyl)zirconium dichloride, diphenylsilylene(cyclopentadienyl) (2,7-dimethyl-3,6-di-tert-butylfluorenyl)zirconium dichloride, and diphenylsilylene(cyclopentadienyl) (2,7-diphenyl-3,6-di-tert-butylfluorenyl)zirconium dichloride.

Among those compounds exemplified above, preferred are those having an aryl group or a substituted aryl group such as a phenyl group, a tolyl group, a t-butylphenyl group, a dimethylphenyl group, a trimethylphenyl group, or a biphenyl group for $R^6$ and $R^{11}$ in the formula [1] because those generate a syndiotactic propylene polymer (A2) having a high melting point.

Furthermore, compounds in which "zirconium" in the compounds exemplified above is replaced with "hafnium" or "titanium", crosslinked metallocene compounds in which "dichloride" is replaced with "difluoride", "dibromide", or "diiodide", and crosslinked metallocene compounds in which "dichloride" is replaced with "dimethyl" or "methylethyl" can also be exemplified.

The crosslinked metallocene compound (K) described above can be produced by any known method without limitation in particular. Examples of a known production method can include the production methods described in WO2001/27124 and WO2004/087775 by the present applicant. In addition, these metallocene compounds can be used singly or in combinations or two or more.

Hereinafter, the organic aluminum oxy compound (L1), the compound (L2) reactive with the crosslinked metallocene compound (K) to form an ion pair, the organic aluminum compound (L3), and the particulate carrier (P) will be specifically described.

Organic Aluminum Oxy Compound (L1)

As the organic aluminum oxy compound (L1), aluminoxane conventionally known can be used as it is. Specifically, examples thereof can include compounds represented by the following formula [2]:

[Chem. 2]

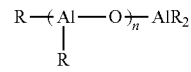

[2]

(where Rs each independently represent a hydrocarbon group having 1 to 10 carbon atoms, and n represents an integer of 2 or more),
and/or the formula [3];

[Chem. 3]

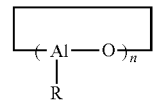

(3)

(where R represents a hydrocarbon group having 1 to 10 carbon atoms; and n represents an integer of 2 or more). In particular, methylaluminoxanes where R is a methyl group and n is 3 or more, preferably 10 or more are used. These aluminoxanes may contain a slight amount of organic aluminum compound without problem.

Examples of the organic aluminum oxy compound (L1) also include modified methylaluminoxanes represented by the following formula [4]:

[Chem. 4]

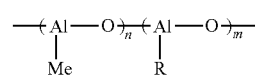

[4]

(where R represents a hydrocarbon group having 1 to 10 carbon atoms; and m and n each independently represent an integer of 2 or more).

This modified methylaluminoxane is prepared using alkylaluminum other than trimethylaluminum and trimethylaluminum. Such a compound [4] is generally called MMAO. Such an MMAO may be prepared by a method described in U.S. Pat. No. 4,960,878 and the like, for example, or a commercially available product can be used as it is.

Compound (L2) Reactive with Crosslinked Metallocene Compound (K) to Form Ion Pair Examples of the compound (L2) reactive with the crosslinked metallocene compound (K) (hereinafter, also abbreviated to and referred to as "ionic compound" in some cases) can include Lewis acids, ionic compounds, borane compounds, and carborane compounds described in Japanese Patent Laid-Open No. 1-501950 and U.S. Pat. No. 5,321,106. Furthermore, examples thereof also can include heteropoly compounds and isopoly compounds.

Organic Aluminum Compound (L3)

Examples of the organic aluminum compound (L3) forming an olefin polymerization catalyst can include organic aluminum compounds represented by the following formula [5]:

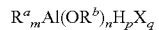

[5]

(where $R^a$ and $R^b$ may be the same or different, and represent a hydrocarbon group having 1 to 15 carbon atoms, preferably 1 to 4 carbon atoms; X represents a halogen atom; m is a number represented by 0<m≤3, n is a number represented by 0≤n<3, p is a number represented by 0≤p<3, q is a number represented by 0≤q<3, and m+n+p+q=3).

Specific examples such a compound can include tri-n-alkyl aluminum such as trimethylaluminum, triethylaluminum, tri-n-butylaluminum, trihexylaluminum, and trioctylaluminum;

tri-branched alkylaluminum such as triisopropylaluminum, triisobutylaluminum, tri-sec-butylaluminum, tri-tert-butyl aluminum, tri-2-methylbutylaluminum, tri-3-methylhexylaluminum, and tri-2-ethylhexylaluminum;

tricycloalkylaluminum such as tricyclohexylaluminum and tricyclooctylaluminum;

triarylaluminum such as triphenylaluminum and tritolylaluminum;

dialkylaluminum hydrides such as diisopropylaluminum hydride and diisobutylaluminum hydride;

alkenylaluminum represented by the formula $(i-C_4H_9)_xAl_y(C_5H_{10})_z$ (where, x, y, and z are positive number, z≤2x), such as isoprenylaluminum;

alkylaluminum alkoxides such as isobutylaluminum methoxide and isobutylaluminum ethoxide;

dialkylaluminum alkoxides such as dimethylaluminum methoxide, diethylaluminum ethoxide, and dibutylaluminum butoxide;

alkylaluminum sesquialkoxides such as ethylaluminum sesquiethoxide and butylaluminum sesquibutoxide;

partially alkoxyated alkylaluminum having an average composition represented by the formula $R^a{}_{2.5}Al(OR^b)_{0.5}$;

alkylaluminum aryloxides such as diethylaluminum phenoxide and diethylaluminum (2,6-di-t-butyl-4-methylphenoxide);

dialkylaluminum halides such as dimethylaluminum chloride, diethylaluminum chloride, dibutylaluminum chloride, diethylaluminum bromide, and diisobutylaluminum chloride;

alkylaluminum sesquihalides such as ethylaluminum sesquichloride, butylaluminum sesquichloride, and ethylaluminum sesquibromide;

partially halogenated alkylaluminum such as alkylaluminum dihalides such as ethylaluminum dichloride;

dialkylaluminum hydrides such as diethylaluminum hydride and dibutylaluminum hydride;

another partially hydrogenated alkylaluminum such as alkylaluminum dihydrides such as ethylaluminum dihydride and propylaluminum dihydride; and partially alkoxylated and halogenated alkylaluminum such as ethylaluminum ethoxychloride, butylaluminum butoxychloride, and ethylaluminum ethoxybromide.

From the viewpoint of availability, trimethylaluminum and triisobutylaluminum are preferably used as the organic aluminum compound (L3).

Particulate Carrier (P)

The particulate carrier (P) is an inorganic or organic compound in the form of a granular or nanoparticulate solid. Among these, preferred inorganic compounds are porous oxides, inorganic chlorides, clay, clay minerals, or ion exchangeable layer compounds.

As the porous oxides, specifically, $SiO_2$, $Al_2O_3$, MgO, ZrO, $TiO_2$, $B_2O_3$, CaO, ZnO, BaO, $ThO_2$, or a composite product or a mixture containing these, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$, or $SiO_2$—$TiO_2$—MgO, can be used. Among these porous oxides, those containing $SiO_2$ and/or $Al_2O_3$ as main components are preferred.

The inorganic oxide may contain a small amount of carbonates, sulfates, nitrates, and oxide components of $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, and $Li_2O$.

As the inorganic halides, $MgCl_2$, $MgBr_2$, $MnCl_2$, and $MnBr_2$ are used. These inorganic halides may be used as they are, or may be used after pulverization with a ball mill or a vibration mill. Alternatively, an inorganic halide may be dissolved in a solvent such as alcohol, and may be precipitated into a nanoparticulate form with a depositing agent. Such a nanoparticulate form may also be used.

The clay is usually composed of a clay mineral as a main component. The ion exchangeable layer compound is a compound having a crystal structure composed of planes formed with ionic bond, etc. and laminated with weak bonding power in parallel with each other. The ion exchangeable layer compound contains exchangeable ions. Most of clay minerals are ion exchangeable layer compounds. In addition, these clay, clay minerals, and ion exchangeable layer compounds are not only natural products, but also artificial synthetic products can be used. Examples of the clay, clay mineral, or ion exchangeable layer compound include clay, clay minerals, and ion crystalline compounds having a layered crystal structure of a hexagonal close-packed type, an antimony type, a $CdCl_2$ type, or a $CdI_2$ type.

The ion exchangeable layer compound may be a layered compound having an interlayer expanded through exchange of the exchangeable ion in the interlayer for another bulky ion utilizing the ion exchangeability. Preferred are clay or clay minerals, and particularly preferred are montmorillonite, vermiculite, pectolite, taeniolite, and synthetic mica.

Examples of the organic compound can include a granular or nanoparticulate solid having a particle diameter in the range of 3 to 300 μm, or 10 to 300 μm. Specifically, examples thereof can include (co)polymers or vinyl cyclohexanes generated using α-olefins having 2 to 14 carbon atoms, such as ethylene, propylene, 1-butene, and 4-methyl-1-pentene, as a main component; (co)polymers generated using styrene as a main component; and modified products thereof.

The catalyst for polymerization can also contain an optional catalyst component or an organic compound component (E), such as alcohols, phenolic compounds, carboxylic acids, phosphorus compounds, and sulfonates.

During polymerization, the method of using the compounds and the order of addition are arbitrarily selected. Examples of the methods can include:

(1) a method in which the compound (K) is added alone to a reactor, (2) a method in which the compound (K) and the compound (L) are added to a reactor in any order, (3) a method in which a catalyst comprising the compound (K) on the particulate carrier (P) and the compound (L) are added to a reactor in any order, (4) a method in which a catalyst comprising the compound (L) on the particulate carrier (P) and the compound (K) are added to a reactor in any order, and (5) a method in which a catalyst comprising the compound (K) and the compound (L) on the particulate carrier (P) are added to a reactor.

In the methods (2) to (5) above, at least two or more of the catalysts may be preliminarily brought into contact with each other.

In the methods (4) and (5) where the compound (L) is carried on the particulate carrier (P), a compound (L) not carried on the particulate carrier (P) may be added in any order as necessary. In this case, the compound (L) on the particulate carrier (P) may be the same as or different from the compound (L) not carried on the particulate carrier (P).

Moreover, the solid catalyst component comprising the compound (K) on the particulate carrier (P) and the solid catalyst component comprising the compound (K) and the compound (L) on the particulate carrier (P) may be subjected to preparative polymerization with olefin, or another catalyst component may be carried on the solid catalyst component subjected to preparative polymerization.

The polymerization can be performed by any process of liquid phase polymerization, such as solution polymerization, suspension polymerization, or gaseous phase polymerization. Examples of an inactive hydrocarbon solvent used in liquid phase polymerization, specifically, can include aliphatic hydrocarbons such as propane, butane, pentane, hexane, heptane, octane, decane, dodecane, and kerosene; alicyclic hydrocarbons such as cyclopentane, cyclohexane, and methyl cyclopentane; aromatic hydrocarbons such as benzene, toluene, and xylene; and halogenated hydrocarbons such as ethylene chloride, chlorobenzene, and dichloromethane; or mixtures thereof. Olefin itself can also be used as a solvent.

During polymerization of olefin in the presence of such an olefin catalyst for polymerization described above, the compound (K) is used in an amount of usually $10^{-9}$ to $10^{-1}$ mol, preferably $10^{-8}$ to $10^{-2}$ mol per liter of reaction volume.

The compound (L1) is used in an amount such that the molar ratio [(L1)/M] of the compound (L1) to all the transition metal atoms (M) in the compound (K) is usually 0.01 to 5000, preferably 0.05 to 2000. The compound (L2) is used in an amount such that the molar ratio [(L2)/M] of the compound (L2) to all the transition metal atoms (M) in the compound (K) is usually 1 to 10, preferably 1 to 5. The compound (L3) is used in an amount such that the molar ratio [(L3)/M] of the aluminum atom in the compound (L3) to all the transition metal atoms (M) in the compound (K) is usually 10 to 5000, preferably 20 to 2000.

If the compound (L) is the compound (L1), the component (E) is used in an amount such that the molar ratio [(E)/(L1)] is usually 0.01 to 10, preferably 0.1 to 5. If the compound (L) is the compound (L2), the component (E) is used in an amount such that the molar ratio [(E)/(L2)] is usually 0.01 to 10, preferably 0.1 to 5. If the compound (L) is the compound (L3), the component (E) is used in an amount such that the molar ratio [(E)/(L3)] is usually 0.01 to 2, preferably 0.005 to 1.

The polymerization temperature for olefin using such an olefin polymerization catalyst is in the range of usually −50 to +200° C., preferably 0 to 170° C. The polymerization pressure is usually normal pressure to 10 MPa gauge pressure, preferably normal pressure to 5 MPa gauge pressure; under such a condition, the polymerization reaction can be performed by any of a batch method, a semi-continuous method, and a continuous method. Furthermore, polymerization can be performed at two or more stages under different reaction conditions. The molecular weight of the resulting olefin polymer can also be adjusted by the presence of hydrogen in the polymerization system or through variation of the polymerization temperature. Furthermore, the molecular weight can also be adjusted by the amount of the compound (L) to be used. If hydrogen is added, an appropriate amount thereof is about 0.001 to 100 NL per kg of olefin.

(B) Soft Propylene Copolymer

The soft propylene copolymer (B) satisfies the following requirement (b):

(b) an MFR measured at 230° C. and a load of 2.16 kg according to ASTM D-1238 is in the range of 0.01 to 100 g/10 min, and one or more of the following requirements (b-1) and (b-2) is satisfied:

(b-1) A syndiotactic triad fraction (rr fraction) measured by $^{13}$C-NMR is 60% or more, and (b-2) a structural unit derived from propylene is contained at 55 to 90 mol % and a structural unit derived from at least one olefin selected from α-olefins having 2 to 20 carbon atoms (excluding propylene) 10 to 45 mol % of (provided that a total of the structural unit derived from propylene and the structural units derived from α-olefins having 2 to 20 carbon atoms (excluding propylene) is 100 mol %), and the relation between a intrinsic viscosity [η] (dL/g) measured at 135° C. in decalin and the MFR (g/10 min, 230° C., load: 2.16 kg) satisfies the relation represented by an expression:

$$1.50 \times MFR^{-0.20} \leq [\eta] \leq 2.65 \times MFR^{-0.20}.$$

Hereinafter, the requirement (b) and others will be described in detail.

Requirement (b)

The soft propylene copolymer (B) has a melt flow rate (MFR; ASTM D-1238, at 230° C. under a load of 2.16 kg) of 0.01 to 50 g/10 min, preferably 0.01 to 30 g/10 min.

In addition, the soft propylene copolymer (B) satisfies one or more of the requirements (b-1) and (b-2).

(Requirement (b-1))

The syndiotactic triad fraction (rr fraction, triad syndiotacticity) of the soft propylene copolymer (B) measured by $^{13}$C-NMR is 60% or more, preferably 70% or more, more preferably 75% or more. An rr fraction in this range is preferred because the stress absorption performance of the resin composition is exhibited.

The rr fraction is determined from Prr (absorption intensity derived from the methyl group of the second unit in the syndiotactic bonding site of three continuous propylene units) and Pw (absorption intensity derived from all the methyl groups in the propylene units) in a $^{13}$C-NMR spectrum from the following expression (2):

$$rr \text{ fraction} = Prr/Pw \qquad (2)$$

Here, if mr-derived absorption (absorption derived from at least both of a syndiotactic bond and an isotactic bond among the three propylene units, used in determination of Pmr (absorption intensity)), rr-derived absorption (absorption derived from the methyl group of the second unit in the syndiotactic bonding site of three continuous propylene units, used in determination of Prr (absorption intensity)), or mm-derived absorption (absorption derived from the methyl group of the second unit in the isotactic bonding site of three continuous propylene units, used in determination of Pmm (absorption intensity)) overlaps with the absorption derived from the comonomer, the calculation is performed as it is without subtracting the contribution of the comonomer component.

Specifically, in the description of determination of "Syndiotacticity parameter (SP value)" described in paragraphs [0018] to [0031] in Japanese Patent Laid-Open No. 2002-097325, the rr fraction is determined by performing the steps described in [0018] to [0023], and calculating the rr fraction from the integration intensity of signals from the first region, the second region, and the third region from the expression (2) above.

In the present invention, it is desired that particularly the $rr_1$ value, specifically, the value determined according to the determination of "Syndiotacticity parameter (SP value)" described in paragraphs [0018] to [0031] in Japanese Patent Laid-Open No. 2002-097325 be 60% or more, preferably 65% or more, more preferably 70% or more. In other words, the $rr_1$ value is obtained through subtraction of the contribution of the comonomer component in the calculation of the rr value if mr-derived absorption (absorption derived from at least both of a syndiotactic bond and an isotactic bond among the three propylene units, used in determination of Pmr (absorption intensity)), rr-derived absorption (absorption derived from the methyl group of the second unit in the syndiotactic bonding site of three continuous propylene units, used in determination of Prr (absorption intensity)), or mm-derived absorption (absorption derived from the methyl group of the second unit in the isotactic bonding site of three continuous propylene units, intensity used in determination of Pmm (absorption intensity)) overlaps with the absorption derived from the comonomer.

In the measurement of the rr value and the $rr_1$ value, NMR measurement is performed as follows, for example. That is, a sample (0.35 g) is dissolved in hexachlorobutadiene (2.0 mL) by heating. This solution is filtered through a glass filter (G2), and deuterated benzene (0.5 mL) is added thereto. The solution is placed into an NMR tube having an inner diameter of 10 mm. A GX-400 NMR analyzer made by JEOL, Ltd. is then used to perform $^{13}$C-NMR measurement at 120° C. The number of accumulation is 8,000 times or more.

(Requirement (b-2))

The soft propylene copolymer (B) contains 55 to 90 mol % of the structural unit derived from propylene and 10 to 45 mol % of the structural unit derived from an α-olefin having 2 to 20 carbon atoms (excluding propylene) (provided that a total of the structural unit derived from propylene and the structural unit derived from the α-olefin (excluding propylene) having 2 to 20 carbon atoms is 100 mol %). The intrinsic viscosity [$_h$] (dL/g) measured at 135° C. in decalin and the MFR (g/10 min) measured at 230° C. and a load of 2.16 kg according to ASTM D-1238 satisfy the relation represented by the following expression:

$$1.50 \times MFR^{-0.20} \leq [\eta] \leq 2.65 \times MFR^{-0.20}$$

Examples of the α-olefin having 2 to 20 carbon atoms (excluding propylene) include ethylene, 3-methyl-1-butene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. Particularly preferred are ethylene, 1-butene, 1-hexene, 4-methyl-1-pentene, and 1-octene.

The intrinsic viscosity [ii] and the MFR preferably satisfy the relation represented by the following expression:

$$1.80 \times MFR^{-0.20} \leq [\eta] \leq 2.50 \times MFR^{-0.19}$$

(Other Requirements)

Preferably the melting point of the soft propylene copolymer (B) observed by differential scanning calorimetry (DSC) is less than 100° C., or no melting point is observed. Here, the term "no melting point is observed" indicates that a crystal melting peak having a crystal melting enthalpy of 1 J/g or more is not observed in the range of −150 to 200° C. The details of the condition for the measurement of the melting point are as described in Examples later.

The intrinsic viscosity [η] of the soft propylene copolymer (B) measured at 135° C. in decalin is 0.1 to 10 dL/g, preferably 0.5 to 10 dL/g.

The degree of crystallization of the soft propylene copolymer (B) measured by X-ray diffraction is preferably 20% or less, more preferably 0 to 15%.

The soft propylene copolymer (B) has a single glass transition temperature, and the glass transition temperature (Tg) obtained by differential scanning calorimetry (DSC) is in the range of usually −50° C. to 10° C., preferably −40° C. to 0° C., more preferably −35° C. to 0° C. A soft propylene copolymer (B) having a glass transition temperature (Tg) within this range is preferred because it has high cold resistance and low temperature properties and also exhibits stress absorption performance.

Differential scanning calorimetry is performed as follows, for example. A sample (about 10.00 mg) is placed into a dedicated aluminum pan. Using DSCRDC220 made by Seiko Instruments Inc., the aluminum pan is heated from 30° C. to 200° C. at 200° C./min, and is kept at 200° C. for five minutes. The aluminum pan is then cooled from 200° C. to −100° C. at 10° C./min, and is kept at −100° C. for another five minutes, followed by heating at 10° C./min. From the endothermic curve at this time, the glass transition temperature (Tg) is determined.

The molecular weight distribution (Mw/Mn, in terms of polystyrene, Mw: weight average molecular weight, Mn: number average molecular weight) of the soft propylene copolymer (B) measured by GPC is preferably 3.5 or less, more preferably 3.0 or less, more preferably 2.5 or less. The lower limit value is 1.5 or more, for example.

The soft propylene copolymer (B) may be partially grafted with a polar monomer. Examples of the polar monomer include ethylenically unsaturated compounds containing a hydroxyl group, ethylenically unsaturated compounds containing an amino group, ethylenically unsaturated compounds containing an epoxy group, aromatic vinyl compounds, unsaturated carboxylic acids or derivatives thereof, vinyl ester compounds, and vinyl chloride. The grafted soft propylene copolymer (B) is yielded through graft reaction of the soft propylene copolymer (B) described above with the polar monomer. During graft reaction of the soft propylene copolymer (B) described above with the polar monomer, the polar monomer is used in an amount of usually 1 to 100 parts by mass, preferably 5 to 80 parts by mass relative to 100 parts by mass of the soft propylene copolymer (B). This graft reaction is usually performed in the presence of a radical initiator. As the radical initiator, organic peroxide or an azo compound can be used. The radical initiator can be mixed as it is with the soft propylene copolymer (B) and the polar monomer for use, or may be dissolved in a small amount of an organic solvent for use. Any organic solvent that can dissolve the radical initiator can be used without limitation in particular. During graft polymerization of the soft propylene copolymer (B) described above with the polar monomer, a reducing substance may be used. Use of the reducing substance can improve the graft amount of the polar monomer.

The graft modification of the soft propylene copolymer (B) with the polar monomer can be performed by a method conventionally known, for example, by dissolving the soft propylene copolymer (B) in an organic solvent, and then adding a polar monomer and a radical initiator to the solution to react these materials at a temperature of 70 to 200° C., preferably 80 to 190° C. for 0.5 to 15 hours, preferably 1 to 10 hours. Alternatively, using an extruder, the soft propylene copolymer (B) can be reacted with a polar monomer in the absence of a solvent to produce a modified soft propylene copolymer (B). This reaction is desirably performed at a temperature usually equal to or higher than the melting point of the soft propylene copolymer (B), specifically 120 to 250° C., usually 0.5 to 10 minutes.

The modification amount of the modified soft propylene copolymer thus yielded (graft amount of the polar monomer) is desirably usually 0.1 to 50% by mass, preferably 0.2 to 30% by mass, more preferably 0.2 to 10% by mass.

If the propylene polymer composition according to the present invention contains the modified soft propylene copolymer described above, the propylene polymer composition may have high adhesiveness to and miscibility with other resins to improve the wettability of the surface of molded products.

The soft propylene copolymer (B) used in the present invention can be produced through polymerization of propylene and at least one olefin selected from α-olefins having 2 to 20 carbon atoms (excluding propylene) in the presence of the olefin catalyst for polymerization comprising:

a crosslinked metallocene compound (I') represented by the following formula [6], and at least one or more compounds (II) selected from an organic aluminum oxy compound (II-1), a compound (II-2) reactive with the crosslinked metallocene compound (I') to form an ion pair, and an organic aluminum compound (II-3).

Any catalyst can be used without limitation as long as the resulting polymer satisfies the requirement for the soft propylene copolymer (B).

[Chem. 5]

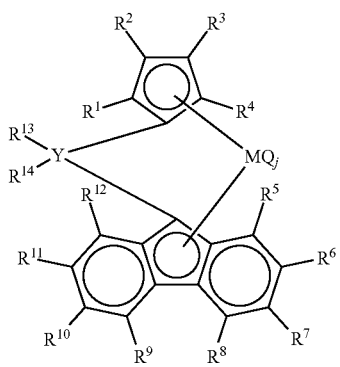

[6]

(where $R^1$, $R^2$, $R^3$, $R^4$, $R^5$, $R^8$, $R^9$, and $R^{12}$ are an atom or a group selected from a hydrogen atom, a hydrocarbon group, and a silicon containing group, and may be the same or different, $R^6$ and $R^{11}$ are the same atom or group selected from a hydrogen atom, a hydrocarbon group, and a silicon containing group, $R^7$ and $R^{10}$ are the same atom or group selected from a hydrogen atom, a hydrocarbon group, and a silicon containing group, none of $R^6$, $R^7$, $R^{10}$, and $R^{11}$ is a hydrogen atom at the same time, $R^2$ and $R^3$ may be bonded to each other to form a ring, and adjacent groups among $R^5$ to $R^{12}$ may be bonded to each other to form a ring.

$R^{13}$ and $R^{14}$ are selected from an aryl group having 6 to 18 carbon atoms, an alkyl group having 1 to 40 carbon atoms, an alkylaryl group having 6 to 40 carbon atoms, a fluoroaryl group having 6 to 20 carbon atoms, a fluoroalkylaryl group having 7 to 40 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, and an iodoalkylaryl group having 7 to 40 carbon atoms, and may be the same or different, at least one of $R^{13}$ and $R^{14}$ is selected from an aryl group having 7 to 18 carbon atoms, a chloroaryl group having 6 to 20 carbon atoms, a chloroalkylaryl group having 7 to 40 carbon atoms, a bromoaryl group having 6 to 20 carbon atoms, a bromoalkylaryl group having 7 to 40 carbon atoms, an iodoaryl group having 6 to 20 carbon atoms, an iodoalkylaryl group having 7 to 40 carbon atoms, and a fluoroalkylaryl group having 7 to 40 carbon atoms, M is Ti, Zr, or Hf, Y is carbon or silicon, Q is selected as a combination of identical or different groups selected from halogen, a hydrocarbon group, a neutral, conjugated, or non-conjugated diene having 10 or less carbon atoms, an anion ligand, and a neutral ligand having a lone pair allowing coordination, and j is an integer of 1 to 4).

Specific examples of the crosslinked metallocene compound represented by the above formula [6] will be shown below, but these examples are not intended to be limitative to the scope of the present invention in particular. Here, octamethyloctahydrodibenzofluorene indicates the structure represented by the formula [7], octamethyltetrahydrodicyclopentafluorene indicates the structure represented by the formula [8], and dibenzofluorene indicates the structure represented by the formula [9].

[Chem. 6]

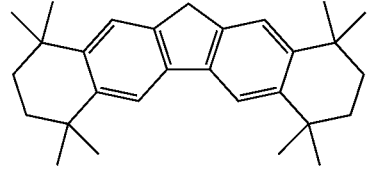

[7]

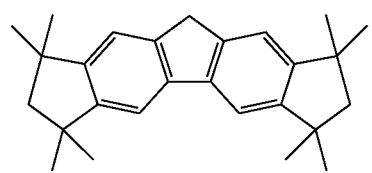

[8]

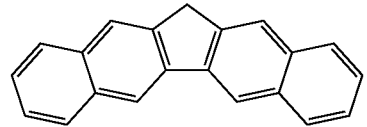

[9]

Examples of the crosslinked metallocene compound represented by the above formula [6] can include di-(p-chlorophenyl)methylene(cyclopentadienyl) (2,7-di-tert-butylfluorenyl)zirconium dichloride, di-(p-chlorophenyl)methylene(cyclopentadienyl) (3,6-di-tert-butylfluorenyl) zirconium dichloride, di-(p-chlorophenyl)methylene (cyclopentadienyl) (octamethyloctahydrodibenzofluorenyl) zirconium dichloride, di-(p-chlorophenyl)methylene (cyclopentadienyl) (octamethyltetrahydro dicyclopentafluorenyl)zirconium dichloride, di-(p-chlorophenyl)methylene(cyclopentadienyl) (dibenzofluorenyl)zirconium dichloride, di-(p-chlorophenyl)methylene(cyclopentadienyl) (2,7-diphenyl-3,6-di-tert-butylfluorenyl)

zirconium dichloride, di-(p-chlorophenyl)methylene(cyclopentadienyl) (2,7-dimethyl-3,6-di-tert-butylfluorenyl) zirconium dichloride, di-(p-chlorophenyl)methylene(cyclopentadienyl) (2,7-(trimethylphenyl)-3,6-di-tert-butylfluorenyl)zirconium dichloride, di-(p-chlorophenyl)methylene(cyclopentadienyl) (2,7-(dimethylphenyl)-3,6-di-tert-butylfluorenyl)zirconium dichloride, di-(p-chlorophenyl)methylene(cyclopentadienyl) (2,3,6,7-tetra-tert-butylfluorenyl)zirconium dichloride, di-(m-chlorophenyl)methylene(cyclopentadienyl) (2,7-di-tert-butylfluorenyl)zirconium dichloride, di-(m-chlorophenyl)methylene(cyclopentadienyl) (3,6-di-tert-butylfluorenyl) zirconium dichloride, di-(m-chlorophenyl)methylene (cyclopentadienyl) (octamethyloctahydrodibenzofluorenyl) zirconium dichloride, di-(m-chlorophenyl)methylene (cyclopentadienyl) (octamethyltetrahydrodicyclopentafluorenyl)zirconium dichloride, di-(m-chlorophenyl)methylene(cyclopentadienyl) (dibenzofluorenyl)zirconium dichloride, di-(m-chlorophenyl)methylene(cyclopentadienyl) (2,7-diphenyl-3,6-di-tert-butylfluorenyl) zirconium dichloride, di-(m-chlorophenyl)methylene (cyclopentadienyl) (2,7-dimethyl-3,6-di-tert-butylfluorenyl) zirconium dichloride, di-(m-chlorophenyl)methylene (cyclopentadienyl) (2,7-(trimethylphenyl)-3,6-di-tert-butylfluorenyl)zirconium dichloride, di-(m-chlorophenyl)methylene(cyclopentadienyl) (2,7-(dimethylphenyl)-3,6-di-tert-butylfluorenyl)zirconium dichloride, di-(m-chlorophenyl)methylene(cyclopentadienyl) (2,3,6,7-tetra-tert-butylfluorenyl) zirconium dichloride, di-(p-bromophenyl)methylene(cyclopentadienyl) (2,7-di-tert-butylfluorenyl)zirconium dichloride, di-(p-bromophenyl)methylene(cyclopentadienyl) (3,6-di-tert-butylfluorenyl) zirconium dichloride, di-(p-bromophenyl)methylene (cyclopentadienyl) (octamethyloctahydrodibenzofluorenyl) zirconium dichloride, di-(p-bromophenyl)methylene (cyclopentadienyl) (octamethyltetrahydrodicyclopentafluorenyl)zirconium dichloride, di-(p-bromophenyl)methylene(cyclopentadienyl) (dibenzofluorenyl)zirconium dichloride, di-(p-bromophenyl)methylene(cyclopentadienyl) (2,7-diphenyl-3,6-di-tert-butylfluorenyl)zirconium dichloride, di-(p-bromophenyl)methylene(cyclopentadienyl) (2,7-dimethyl-3,6-di-tert-butylfluorenyl)zirconium dichloride, di-(p-bromophenyl)methylene(cyclopentadienyl) (2,7-(trimethylphenyl)-3,6-di-tert-butylfluorenyl)zirconium dichloride, di-(p-bromophenyl)methylene(cyclopentadienyl) (2,7-(dimethylphenyl)-3,6-di-tert-butylfluorenyl)zirconium dichloride, di-(p-bromophenyl)methylene(cyclopentadienyl) (2,3,6,7-tetra-tert-butylfluorenyl)zirconium dichloride, di-(m-bromophenyl)methylene(cyclopentadienyl) (2,7-di-tert-butylfluorenyl)zirconium dichloride, di-(m-bromophenyl)methylene(cyclopentadienyl) (3,6-di-tert-butylfluorenyl)zirconium dichloride, di-(m-bromophenyl)methylene(cyclopentadienyl) (octamethyloctahydrodibenzofluorenyl)zirconium dichloride, di-(m-bromophenyl)methylene(cyclopentadienyl) (octamethyltetrahydrodicyclopentafluorenyl)zirconium dichloride, di-(m-bromophenyl)methylene(cyclopentadienyl) (dibenzofluorenyl)zirconium dichloride, di-(m-bromophenyl)methylene(cyclopentadienyl) (2,7-diphenyl-3,6-di-tert-butylfluorenyl)zirconium dichloride, di-(m-bromophenyl)methylene(cyclopentadienyl) (2,7-dimethyl-3,6-di-tert-butylfluorenyl)zirconium dichloride, di-(m-bromophenyl)methylene(cyclopentadienyl) (2,7-(trimethylphenyl)-3,6-di-tert-butylfluorenyl)zirconium dichloride, di-(m-bromophenyl)methylene(cyclopentadienyl) (2,7-(dimethylphenyl)-3,6-di-tert-butylfluorenyl)zirconium dichloride, di-(m-bromophenyl)methylene(cyclopentadienyl) (2,3,6,7-tetra-tert-butylfluorenyl) zirconium dichloride, di-(p-iodophenyl)methylene(cyclopentadienyl) (2,7-di-tert-butylfluorenyl)zirconium dichloride, di-(p-iodophenyl) methylene(cyclopentadienyl) (3,6-di-tert-butylfluorenyl) zirconium dichloride, di-(p-iodophenyl)methylene (cyclopentadienyl) (octamethyloctahydrodibenzofluorenyl) zirconium dichloride, di-(p-iodophenyl)methylene (cyclopentadienyl) (octamethyltetrahydrodicyclopentafluorenyl)zirconium dichloride, di-(p-iodophenyl)methylene(cyclopentadienyl) (dibenzofluorenyl)zirconium dichloride, di-(p-iodophenyl)methylene(cyclopentadienyl) (2,7-diphenyl-3,6-di-tert-butylfluorenyl)zirconium dichloride, di-(p-iodophenyl)methylene(cyclopentadienyl) (2,7-dimethyl-3,6-di-tert-butylfluorenyl)zirconium dichloride, di-(p-iodophenyl)methylene(cyclopentadienyl) (2,7-(trimethylphenyl)-3,6-di-tert-butylfluorenyl)zirconium dichloride, di-(p-iodophenyl)methylene(cyclopentadienyl) (2,7-(dimethylphenyl)-3,6-di-tert-butylfluorenyl) zirconium dichloride, di-(p-iodophenyl)methylene(cyclopentadienyl) (2,3,6,7-tetra-tert-butylfluorenyl)zirconium dichloride, di-(m-trifluoromethyl-phenyl)methylene(cyclopentadienyl) (2,7-di-tert-butylfluorenyl)zirconium dichloride, di-(m-trifluoromethyl-phenyl)methylene(cyclopentadienyl) (3,6-di-tert-butylfluorenyl)zirconium dichloride, di-(m-trifluoromethyl-phenyl)methylene(cyclopentadienyl) (octamethyloctahydrodibenzofluorenyl) zirconium dichloride, di-(m-trifluoromethyl-phenyl) methylene(cyclopentadienyl) (octamethyltetrahydrodicyclopentafluorenyl)zirconium dichloride, di-(m-trifluoromethyl-phenyl)methylene(cyclopentadienyl) (dibenzofluorenyl) zirconium dichloride, di-(m-trifluoromethyl-phenyl)methylene(cyclopentadienyl) (2,7-diphenyl-3,6-di-tert-butylfluorenyl)zirconium dichloride, di-(m-trifluoromethyl-phenyl)methylene(cyclopentadienyl) (2,7-dimethyl-3,6-di-tert-butylfluorenyl) zirconium dichloride, di-(m-trifluoromethyl-phenyl) methylene(cyclopentadienyl) (2,7-(trimethylphenyl)-3,6-di-tert-butylfluorenyl)zirconium dichloride, di-(m-trifluoromethyl-phenyl)methylene(cyclopentadienyl) (2,7-(dimethylphenyl)-3,6-di-tert-butylfluorenyl)zirconium dichloride, di-(m-trifluoromethyl-phenyl)methylene (cyclopentadienyl) (2,3,6,7-tetra-tert-butylfluorenyl) zirconium dichloride, di-(p-trifluoromethyl-phenyl) methylene(cyclopentadienyl) (2,7-di-tert-butylfluorenyl) zirconium dichloride, di-(p-trifluoromethyl-phenyl) methylene(cyclopentadienyl) (3,6-di-tert-butylfluorenyl) zirconium dichloride, di-(p-trifluoromethyl-phenyl) methylene(cyclopentadienyl) (octamethyloctahydrodibenzofluorenyl)zirconium dichloride, di-(p-trifluoromethyl-phenyl)methylene(cyclopentadienyl) (octamethyltetrahydrodicyclopentafluorenyl)zirconium dichloride, di-(p-trifluoromethyl-phenyl) methylene(cyclopentadienyl) (dibenzofluorenyl) zirconium dichloride, di-(p-trifluoromethyl-phenyl)methylene(cyclopentadienyl) (2,7-diphenyl-3,6-di-tert-butylfluorenyl)zirconium dichloride, di-(p-trifluoromethyl-phenyl)methylene(cyclopentadienyl) (2,7-dimethyl-3,6-di-tert-butylfluorenyl)zirconium dichloride, di-(p-trifluoromethyl-phenyl)methylene(cyclopentadienyl) (2,7-(trimethylphenyl)-3,6-di-tert-butylfluorenyl) zirconium dichloride, di-(p-trifluoromethyl-phenyl)methylene(cyclopentadienyl) (2,7-(dimethylphenyl)-3,6-di-tert-butylfluorenyl)zirconium dichloride, di-(p-trifluoromethyl-phenyl)methylene(cyclopentadienyl) (2,3,6,7-tetra-tert-butylfluorenyl)zirconium dichloride, di-(p-trichloromethyl-phenyl)methylene(cyclopentadienyl) (2,7-di-tert-butylfluorenyl)zirconium dichloride, di-(p-trichloromethyl-phenyl)methylene(cyclopentadienyl) (3,6-di-tert-butylfluorenyl)zirconium dichloride, di-(p-trichloromethyl-phenyl)methylene(cyclopentadienyl) (octamethyloctahydrodibenzofluorenyl)zirconium dichloride, di-(p-trichloromethyl-phenyl)methylene(cyclopentadienyl) (octamethyltetrahydrodicyclopentafluorenyl)zirconium dichloride, di-(p-trichloromethyl-phenyl)methylene(cyclopentadienyl) (dibenzofluorenyl) zirconium dichloride, di-(p-trichloromethyl-phenyl)methylene(cyclopentadienyl) (2,7-diphenyl-3,6-di-tert-butylfluorenyl)zirconium dichloride, di-(p-trichloromethyl-phenyl)methylene(cyclopentadienyl) (2,7-dimethyl-3,6-di-tert-butylfluorenyl)zirconium dichloride, di-(p-trichloromethyl-phenyl)methylene(cyclopentadienyl) (2,7-(trimethylphenyl)-3,6-di-tert-butylfluorenyl)zirconium dichloride, di-(p-trichloromethyl-phenyl)methylene(cyclopentadienyl) (2,7-(dimethylphenyl)-3,6-di-tert-butylfluorenyl)zirconium dichloride, di-(p-trichloromethyl-phenyl)methylene(cyclopentadienyl) (2,3,6,7-tetra-tert-butylfluorenyl)zirconium dichloride, di-(m-trichloromethyl-phenyl)methylene(cyclopentadienyl) (2,7-di-tert-butylfluorenyl)zirconium dichloride, di-(m-trichloromethyl-phenyl)methylene(cyclopentadienyl) (3,6-di-tert-butylfluorenyl)zirconium dichloride, di-(m-trichloromethyl-phenyl)methylene(cyclopentadienyl) (octamethyloctahydrodibenzofluorenyl)zirconium dichloride, di-(m-trichloromethyl-phenyl)methylene(cyclopentadienyl) (octamethyltetrahydrodicyclopentafluorenyl)zirconium dichloride, di-(m-trichloromethyl-phenyl)methylene(cyclopentadienyl) (dibenzofluorenyl)zirconium dichloride, di-(m-trichloromethyl-phenyl)methylene(cyclopentadienyl) (2,7-diphenyl-3,6-di-tert-butylfluorenyl)zirconium dichloride, di-(m-trichloromethyl-phenyl)methylene(cyclopentadienyl) (2,7-dimethyl-3,6-di-tert-butylfluorenyl)zirconium dichloride, di-(m-trichloromethyl-phenyl)methylene(cyclopentadienyl) (2,7-(trimethylphenyl)-3,6-di-tert-butylfluorenyl) zirconium dichloride,
di-(m-trichloromethyl-phenyl)methylene(cyclopentadienyl) (2,7-(dimethylphenyl)-3,6-di-tert-butylfluorenyl)zirconium dichloride, di-(m-trichloromethyl-phenyl)methylene(cyclopentadienyl) (2,3,6,7-tetra-tert-butylfluorenyl) zirconium dichloride, di-(p-biphenyl)methylene(cyclopentadienyl) (2,7-di-tert-butylfluorenyl)zirconium dichloride, di-(p-biphenyl)methylene(cyclopentadienyl) (3,6-di-tert-butylfluorenyl)zirconium dichloride, di-(p-biphenyl)methylene(cyclopentadienyl) (octamethyloctahydrodibenzofluorenyl)zirconium dichloride, di-(p-biphenyl)methylene(cyclopentadienyl) (octamethyltetrahydrodicyclopentafluorenyl)zirconium dichloride, di-(p-biphenyl)methylene(cyclopentadienyl) (dibenzofluorenyl)zirconium dichloride, di-(p-biphenyl)methylene(cyclopentadienyl) (2,7-diphenyl-3,6-di-tert-butylfluorenyl)zirconium dichloride, di-(p-biphenyl)methylene(cyclopentadienyl) (2,7-dimethyl-3,6-di-tert-butylfluorenyl)zirconium dichloride, di-(p-biphenyl)methylene(cyclopentadienyl) (2,7-(trimethylphenyl)-3,6-di-tert-butylfluorenyl)zirconium dichloride, di-(p-biphenyl)methylene(cyclopentadienyl) (2,7-(dimethylphenyl)-3,6-di-tert-butylfluorenyl)zirconium dichloride, di-(p-biphenyl)methylene(cyclopentadienyl) (2,3,6,7-tetra-tert-butylfluorenyl) zirconium dichloride, di-(3,5-ditrifluoromethyl-phenyl)methylene(cyclopentadienyl) (2,7-di-tert-butylfluorenyl)zirconium dichloride, di-(3,5-ditrifluoromethyl-phenyl)methylene(cyclopentadienyl) (3,6-di-tert-butylfluorenyl)zirconium dichloride, di-(3,5-ditrifluoromethyl-phenyl)methylene(cyclopentadienyl) (octamethyloctahydrodibenzofluorenyl)zirconium dichloride, di-(3,5-ditrifluoromethyl-phenyl)methylene(cyclopentadienyl) (octamethyltetrahydrodicyclopentafluorenyl)zirconium dichloride, di-(3,5-ditrifluoromethyl-phenyl)methylene(cyclopentadienyl) (dibenzofluorenyl) zirconium dichloride, di-(3,5-ditrifluoromethyl-phenyl)methylene(cyclopentadienyl) (2,7-diphenyl-3,6-di-tert-butylfluorenyl)zirconium dichloride, di-(3,5-ditrifluoromethyl-phenyl)methylene(cyclopentadienyl) (2,7-dimethyl-3,6-di-tert-butylfluorenyl)zirconium dichloride, di-(3,5-ditrifluoromethyl-phenyl)methylene(cyclopentadienyl) (2,7-(trimethylphenyl)-3,6-di-tert-butylfluorenyl)zirconium dichloride, di-(3,5-ditrifluoromethyl-phenyl)methylene(cyclopentadienyl) (2,7-(dimethylphenyl)-3,6-di-tert-butylfluorenyl)zirconium dichloride,
di-(3,5-ditrifluoromethyl-phenyl)methylene(cyclopentadienyl) (2,3,6,7-tetra-tert-butylfluorenyl)zirconium dichloride, di-(3,5-dichloromethyl-phenyl)methylene(cyclopentadienyl) (2,7-di-tert-butylfluorenyl)zirconium dichloride, di-(3,5-dichloromethyl-phenyl)methylene(cyclopentadienyl) (3,6-di-tert-butylfluorenyl)zirconium dichloride, di-(3,5-dichloromethyl-phenyl)methylene(cyclopentadienyl) (octamethyloctahydrodibenzofluorenyl)zirconium dichloride, di-(3,5-dichloromethyl-phenyl)methylene(cyclopentadienyl) (octamethyltetrahydrodicyclopentafluorenyl)zirconium dichloride, di-(3,5-dichloromethyl-phenyl)methylene(cyclopentadienyl) (dibenzofluorenyl) zirconium dichloride, di-(3,5-dichloromethyl-phenyl)methylene(cyclopentadienyl) (2,7-diphenyl-3,6-di-tert-butylfluorenyl)zirconium dichloride, di-(3,5-dichloromethyl-phenyl)methylene(cyclopentadienyl) (2,7-dimethyl-3,6-di-tert-butylfluorenyl)zirconium dichloride, di-(3,5-dichloromethyl-phenyl)methylene(cyclopentadienyl) (2,7-(trimethylphenyl)-3,6-di-tert-butylfluorenyl)zirconium dichloride, di-(3,5-dichloromethyl-phenyl)methylene(cyclopentadienyl) (2,7-(dimethylphenyl)-3,6-di-tert-butylfluorenyl)zirconium dichloride, di-(3,5-dichloromethyl-phenyl)methylene(cyclopentadienyl) (2,3,6,7-tetra-tert-butylfluorenyl) zirconium dichloride, di-(4-chloronaphthyl)methylene(cyclopentadienyl) (2,7-di-tert-butylfluorenyl)zirconium dichloride, di-(4-chloronaphthyl)methylene(cyclopentadienyl) (3,6-di-tert-butylfluorenyl)zirconium dichloride, di-(4-chloronaphthyl)methylene(cyclopentadienyl) (octamethyloctahydrodibenzofluorenyl)zirconium dichloride, di-(4-chloronaphthyl)methylene(cyclopentadienyl) (octamethyltetrahydrodicyclopentafluorenyl)zirconium dichloride, di-(4-chloronaphthyl)methylene(cyclopentadienyl) (dibenzofluorenyl)zirconium dichloride, di-(4-chloronaphthyl)methylene(cyclopentadienyl) (2,7-diphenyl-3,6-di-tert-butylfluorenyl)zirconium dichloride, di-(4-chloronaphthyl)methylene(cyclopentadienyl) (2,7-dimethyl-3,6-di-tert-butylfluorenyl)zirconium dichloride, di-(4-chloronaphthyl)methylene(cyclopentadienyl) (2,7-(trimethylphenyl)-3,6-di-tert-butylfluorenyl)zirconium dichloride, di-(4-chloronaphthyl)methylene(cyclopentadienyl) (2,7-(dimethylphenyl)-3,6-di-tert-butylfluorenyl) zirconium dichloride, di-(4-chloronaphthyl)methylene(cyclopentadienyl) (2,3,6,7-tetra-tert-butylfluorenyl) zirconium dichloride, di-(3-chloronaphthyl)methylene(cyclopentadienyl) (2,7-di-tert-butylfluorenyl)zirconium dichloride, di-(3-chloronaphthyl)methylene(cyclopentadienyl) (3,6-di-tert-butylfluorenyl)zirconium dichloride, di-(3-chloronaphthyl)methylene(cyclopentadienyl) (octamethyloctahydrodibenzofluorenyl)zirconium dichloride, di-(3-chloronaphthyl)methylene(cyclopentadienyl) (octamethyltetrahydrodicyclopentafluorenyl)zirconium dichloride, di-(3-chloronaphthyl)methylene(cyclopentadienyl) (dibenzofluorenyl)zirconium dichloride, di-(3-chloronaphthyl)methylene(cyclopentadienyl) (2,7-diphenyl-3,6-di-tert-butylfluorenyl)zirconium dichloride, di-(3-chloronaphthyl)methylene(cyclopentadienyl) (2,7-dimethyl-3,6-di-tert-butylfluorenyl)zirconium dichloride, di-(3-chloronaphthyl)methylene(cyclopentadienyl) (2,7-(trimethylphenyl)-3,6-di-tert-butylfluorenyl)zirconium dichloride, di-(3-chloronaphthyl)methylene(cyclopentadienyl) (2,7-(dimethylphenyl)-3,6-di-tert-butylfluorenyl)zirconium dichloride, di-(3-chloronaphthyl)methylene(cyclopentadienyl) (2,3,6,7-tetra-tert-butylfluorenyl) zirconium dichloride, di-(5-chloronaphthyl)methylene(cyclopentadienyl) (2,7-di-tert-butylfluorenyl)zirconium dichloride, di-(5-chloronaphthyl)methylene(cyclopentadienyl) (3,6-di-tert-butylfluorenyl)zirconium dichloride, di-(5-chloronaphthyl)methylene(cyclopentadienyl) (octamethyloctahydrodibenzofluorenyl)zirconium dichloride, di-(5-chloronaphthyl)methylene(cyclopentadienyl) (octamethyltetrahydrodicyclopentafluorenyl)zirconium dichloride, di-(5-chloronaphthyl)methylene(cyclopentadienyl) (dibenzofluorenyl)zirconium dichloride, di-(5-chloronaphthyl)methylene(cyclopentadienyl) (2,7-diphenyl-3,6-di-tert-butylfluorenyl)zirconium dichloride, di-(5-chloronaphthyl)methylene(cyclopentadienyl) (2,7-dimethyl-3,6-di-tert-butylfluorenyl)zirconium dichloride, di-(5-chloronaphthyl)methylene(cyclopentadienyl) (2,7-(trimethylphenyl)-3,6-di-tert-butylfluorenyl)zirconium dichloride, di-(5-chloronaphthyl)methylene(cyclopentadienyl) (2,7-(dimethylphenyl)-3,6-di-tert-butylfluorenyl)zirconium dichloride, di-(5-chloronaphthyl)methylene(cyclopentadienyl) (2,3,6,7-tetra-tert-butylfluorenyl) zirconium dichloride, phenyl(p-chlorophenyl)methylene(cyclopentadienyl) (2,7-di-tert-butylfluorenyl)zirconium dichloride, phenyl(p-chlorophenyl)methylene(cyclopentadienyl) (3,6-di-tert-butylfluorenyl)zirconium dichloride, phenyl(p-chlorophenyl)methylene(cyclopentadienyl) (octamethyloctahydrodibenzofluorenyl)zirconium dichloride, phenyl(p-chlorophenyl)methylene(cyclopentadienyl) (octamethyltetrahydrodicyclopentafluorenyl)zirconium dichloride, phenyl(p-chlorophenyl)methylene(cyclopentadienyl) (dibenzofluorenyl)zirconium dichloride, phenyl(p-chlorophenyl)methylene(cyclopentadienyl) (2,7-diphenyl-3,6-di-tert-butylfluorenyl)zirconium dichloride, phenyl(p-chlorophenyl)methylene(cyclopentadienyl) (2,7-dimethyl-3,6-di-tert-butylfluorenyl)zirconium dichloride, phenyl(p-chlorophenyl)methylene(cyclopentadienyl) (2,7-(trimethylphenyl)-3,6-di-tert-butylfluorenyl)zirconium dichloride, phenyl(p-chlorophenyl)methylene(cyclopentadienyl) (2,7-(dimethylphenyl)-3,6-di-tert-butylfluorenyl)zirconium dichloride, phenyl(p-chlorophenyl)methylene(cyclopentadienyl) (2,3,6,7-tetra-tert-butylfluorenyl)zirconium dichloride, phenyl(m-chlorophenyl)methylene(cyclopentadienyl) (2,7-di-tert-butylfluorenyl)zirconium dichloride, phenyl(m-chlorophenyl)methylene(cyclopentadienyl) (3,6-di-tert-butylfluorenyl)zirconium dichloride, phenyl(m-chlorophenyl)methylene(cyclopentadienyl) (octamethyloctahydrodibenzofluorenyl)zirconium dichloride, phenyl(m-chlorophenyl)methylene(cyclopentadienyl) (octamethyltetrahydrodicyclopentafluorenyl)zirconium dichloride, phenyl(m-chlorophenyl)methylene(cyclopentadienyl) (dibenzofluorenyl)zirconium dichloride, phenyl(m-chlorophenyl)methylene(cyclopentadienyl) (2,7-diphenyl-3,6-di-tert-butylfluorenyl)zirconium dichloride, phenyl(m-chlorophenyl)methylene(cyclopentadienyl) (2,7-dimethyl-3,6-di-tert-butylfluorenyl)zirconium dichloride, phenyl(m-chlorophenyl)methylene(cyclopentadienyl) (2,7-(trimethylphenyl)-3,6-di-tert-butylfluorenyl)zirconium dichloride, phenyl(m-chlorophenyl)methylene(cyclopentadienyl) (2,7-(dimethylphenyl)-3,6-di-tert-butylfluorenyl)zirconium dichloride, phenyl(m-chlorophenyl)methylene(cyclopentadienyl) (2,3,6,7-tetra-tert-butylfluorenyl) zirconium dichloride, phenyl(m-trifluoromethyl-phenyl)methylene(cyclopentadienyl) (2,7-di-tert-butylfluorenyl)zirconium dichloride, phenyl(m-trifluoromethyl-phenyl)methylene(cyclopentadienyl) (3,6-di-tert-butylfluorenyl)zirconium dichloride, phenyl(m-trifluoromethyl-phenyl)methylene(cyclopentadienyl) (octamethyloctahydrodibenzofluorenyl)zirconium dichloride, phenyl(m-trifluoromethyl-phenyl)methylene(cyclopentadienyl) (octamethyltetrahydrodicyclopentafluorenyl)zirconium dichloride, phenyl(m-trifluoromethyl-phenyl)methylene(cyclopentadienyl) (dibenzofluorenyl) zirconium dichloride, phenyl(m-trifluoromethyl-phenyl)methylene(cyclopentadienyl) (2,7-diphenyl-3,6-di-tert-butylfluorenyl)zirconium dichloride, phenyl(m-trifluoromethyl-phenyl)methylene(cyclopentadienyl) (2,7-dimethyl-3,6-di-tert-butylfluorenyl)zirconium dichloride, phenyl(m-trifluoromethyl-phenyl)methylene(cyclopentadienyl) (2,7-(trimethylphenyl)-3,6-di-tert-butylfluorenyl)zirconium dichloride, phenyl(m-trifluoromethyl-phenyl)methylene(cyclopentadienyl) (2,7-(dimethylphenyl)-3,6-di-tert-butylfluorenyl)zirconium dichloride, phenyl(m-trifluoromethyl-phenyl)methylene(cyclopentadienyl) (2,3,6,7-tetra-tert-butylfluorenyl)zirconium dichloride, naphthyl(p-chlorophenyl)methylene(cyclopentadienyl) (2,7-di-tert-butylfluorenyl)zirconium dichloride, naphthyl(p-chlorophenyl)methylene(cyclopentadienyl) (3,6-di-tert-butylfluorenyl)zirconium dichloride, naphthyl(p-chlorophenyl)methylene(cyclopentadienyl) (octamethyloctahydrodibenzofluorenyl)zirconium dichloride, naphthyl(p-chlorophenyl)methylene(cyclopentadienyl) (octamethyltetrahydrodicyclopentafluorenyl)zirconium dichloride, naphthyl(p-chlorophenyl)methylene(cyclopentadienyl) (dibenzofluorenyl)zirconium dichloride, naphthyl(p-chlorophenyl)methylene(cyclopentadienyl) (2,7-diphenyl-3,6-di-tert-butylfluorenyl)zirconium dichloride, naphthyl(p-chlorophenyl)methylene(cyclopentadienyl) (2,7-dimethyl-3,6-di-tert-butylfluorenyl)zirconium dichloride, naphthyl(p-chlorophenyl)methylene(cyclopentadienyl) (2,7-(trimethylphenyl)-3,6-di-tert-butylfluorenyl)zirconium dichloride, naphthyl(p-chlorophenyl)methylene(cyclopentadienyl) (2,7-(dimethylphenyl)-3,6-di-tert-butylfluorenyl)zirconium dichloride, naphthyl(p-chlorophenyl)methylene(cyclopentadienyl) (2,3,6,7-tetra-tert-butylfluorenyl)zirconium dichloride, naphthyl(m-chlorophenyl)methylene(cyclopentadienyl) (2,7-di-tert-butylfluorenyl)zirconium dichloride, naphthyl(m-chlorophenyl)methylene(cyclopentadienyl) (3,6-di-tert-butylfluorenyl)zirconium dichloride, naphthyl(m-chlorophenyl)methylene(cyclopentadienyl) (octamethyloctahydrodibenzofluorenyl)zirconium dichloride, naphthyl(m-chlorophenyl)methylene(cyclopentadienyl) (octamethyltetrahydrodicyclopentafluorenyl)zirconium dichloride, naphthyl(m-chlorophenyl)methylene(cyclopentadienyl) (dibenzofluorenyl)zirconium dichloride, naphthyl(m-chlorophenyl)methylene(cyclopentadienyl) (2,7-diphenyl-3,6-di-tert-butylfluorenyl)zirconium dichloride, naphthyl(m-chlorophenyl)methylene(cyclopentadienyl) (2,7-dimethyl-3,6-di-tert-butylfluorenyl)zirconium dichloride, naphthyl(m-chlorophenyl)methylene(cyclopentadienyl) (2,7-(trimethylphenyl)-3,6-di-tert-butylfluorenyl)zirconium dichloride, naphthyl(m-chlorophenyl)methylene(cyclopentadienyl) (2,7-(dimethylphenyl)-3,6-di-tert-butylfluorenyl)zirconium dichloride, naphthyl(m-chlorophenyl)methylene(cyclopentadienyl) (2,3,6,7-tetra-tert-butylfluorenyl)zirconium dichloride, naphthyl(m-trifluoromethyl-phenyl)methylene(cyclopentadienyl) (2,7-di-tert-butylfluorenyl)zirconium dichloride, naphthyl(m-trifluoromethyl-phenyl)methylene(cyclopentadienyl) (3,6-di-tert-butylfluorenyl)zirconium dichloride, naphthyl(m-trifluoromethyl-phenyl)methylene(cyclopentadienyl) (octamethyloctahydrodibenzofluorenyl)zirconium dichloride, naphthyl(m-trifluoromethyl-phenyl)methylene(cyclopentadienyl) (octamethyltetrahydrodicyclopentafluorenyl)zirconium dichloride, naphthyl(m-trifluoromethyl-phenyl)methylene(cyclopentadienyl) (dibenzofluorenyl)zirconium dichloride, naphthyl(m-trifluoromethyl-phenyl)methylene(cyclopentadienyl) (2,7-diphenyl-3,6-di-tert-butylfluorenyl)zirconium dichloride, naphthyl(m-trifluoromethyl-phenyl)methylene(cyclopentadienyl) (2,7-dimethyl-3,6-di-tert-butylfluorenyl)zirconium dichloride, naphthyl(m-trifluoromethyl-phenyl)methylene(cyclopentadienyl) (2,7-(trimethylphenyl)-3,6-di-tert-butylfluorenyl)zirconium dichloride, naphthyl(m-trifluoromethyl-phenyl)methylene(cyclopentadienyl) (2,7-(dimethylphenyl)-3,6-di-tert-butylfluorenyl)zirconium dichloride, naphthyl(m-trifluoromethyl-phenyl)methylene(cyclopentadienyl) (2,3,6,7-tetra-tert-butylfluorenyl)zirconium dichloride, (p-tolyl) (p-chlorophenyl)methylene(cyclopentadienyl) (2,7-di-tert-butylfluorenyl)zirconium dichloride, (p-tolyl) (p-chlorophenyl)methylene(cyclopentadienyl) (3,6-di-tert-butylfluorenyl)zirconium dichloride, (p-tolyl) (p-chlorophenyl)methylene(cyclopentadienyl) (octamethyloctahydrodibenzofluorenyl)zirconium dichloride, (p-tolyl) (p-chlorophenyl)methylene(cyclopentadienyl) (octamethyltetrahydrodicyclopentafluorenyl)zirconium dichloride, (p-tolyl) (p-chlorophenyl)methylene(cyclopentadienyl) (dibenzofluorenyl)zirconium dichloride, (p-tolyl)(p-chlorophenyl)methylene(cyclopentadienyl) (2,7-diphenyl-3,6-di-tert-butylfluorenyl)zirconium dichloride, (p-tolyl) (p-chlorophenyl)methylene(cyclopentadienyl) (2,7-dimethyl-3,6-di-tert-butylfluorenyl)zirconium dichloride, (p-tolyl) (p-chlorophenyl)methylene(cyclopentadienyl) (2,7-(trimethylphenyl)-3,6-di-tert-butylfluorenyl)zirconium dichloride, (p-tolyl) (p-chlorophenyl)methylene(cyclopentadienyl) (2,7-(dimethylphenyl)-3,6-di-tert-butylfluorenyl)zirconium dichloride, (p-tolyl) (p-chlorophenyl)methylene(cyclopentadienyl) (2,3,6,7-tetra-tert-butylfluorenyl) zirconium dichloride, (p-tolyl) (m-chlorophenyl)methylene(cyclopentadienyl) (2,7-di-tert-butylfluorenyl)zirconium dichloride, (p-tolyl) (m-chlorophenyl)methylene(cyclopentadienyl) (3,6-di-tert-butylfluorenyl)zirconium dichloride, (p-tolyl) (m-chlorophenyl)methylene(cyclopentadienyl) (octamethyloctahydrodibenzofluorenyl)zirconium dichloride, (p-tolyl) (m-chlorophenyl)methylene(cyclopentadienyl) (octamethyltetrahydrodicyclopentafluorenyl)zirconium dichloride, (p-tolyl) (m-chlorophenyl)methylene(cyclopentadienyl) (dibenzofluorenyl)zirconium dichloride, (p-tolyl)(m-chlorophenyl)methylene(cyclopentadienyl) (2,7-diphenyl-3,6-di-tert-butylfluorenyl)zirconium dichloride, (p-tolyl) (m-chlorophenyl)methylene(cyclopentadienyl) (2,7-dimethyl-3,6-di-tert-butylfluorenyl)zirconium dichloride, (p-tolyl) (m-chlorophenyl)methylene(cyclopentadienyl) (2,7-(trimethylphenyl)-3,6-di-tert-butylfluorenyl)zirconium dichloride, (p-tolyl) (m-chlorophenyl)methylene(cyclopentadienyl) (2,7-(dimethylphenyl)-3,6-di-tert-butylfluorenyl)zirconium dichloride, (p-tolyl) (m-chlorophenyl)methylene(cyclopentadienyl) (2,3,6,7-tetra-tert-butylfluorenyl)zirconium dichloride, (p-tolyl) (m-trifluoromethyl-phenyl)methylene(cyclopentadienyl) (2,7-di-tert-butylfluorenyl)zirconium dichloride, (p-tolyl) (m-trifluoromethyl-phenyl)methylene(cyclopentadienyl) (3,6-di-tert-butylfluorenyl)zirconium dichloride, (p-tolyl) (m-trifluoromethyl-phenyl)methylene(cyclopentadienyl) (octamethyloctahydrodibenzofluorenyl)zirconium dichloride, (p-tolyl) (m-trifluoromethyl-phenyl)methylene(cyclopentadienyl) (octamethyltetrahydrodicyclopentafluorenyl)zirconium dichloride, (p-tolyl) (m-trifluoromethyl-phenyl)methylene(cyclopentadienyl) (dibenzofluorenyl)zirconium dichloride, (p-tolyl) (m-trifluoromethyl-phenyl)methylene(cyclopentadienyl) (2,7-diphenyl-3,6-di-tert-butylfluorenyl)zirconium dichloride, (p-tolyl) (m-trifluoromethyl-phenyl)methylene(cyclopentadienyl) (2,7-dimethyl-3,6-di-tert-butylfluorenyl)zirconium dichloride, (p-tolyl) (m-trifluoromethyl-phenyl)methylene(cyclopentadienyl) (2,7-(trimethylphenyl)-3,6-di-tert-butylfluorenyl)zirconium dichloride, (p-tolyl) (m-trifluoromethyl-phenyl)methylene(cyclopentadienyl) (2,7-(dimethylphenyl)-3,6-di-tert-butylfluorenyl)zirconium dichloride, and (p-tolyl) (m-trifluoromethyl-phenyl)methylene(cyclopentadienyl) (2,3,6,7-tetra-tert-butylfluorenyl)zirconium dichloride.

Furthermore, compounds in which "zirconium" in the compounds exemplified above is replaced with "hafnium" or "titanium", metallocene compounds in which "dichloride" is replaced with "difluoride", "dibromide", or "diiodide", and metallocene compounds in which "dichloride" is replaced with "dimethyl" or "methylethyl" are also metallocene compounds represented by the formula [6].

As the crosslinked metallocene compound (I'), a metallocene compound according to International Publication No. WO 2004-087775 can also be used.

The crosslinked metallocene compound (I') can be produced with reference to the known method described above. Examples of the known production method can include a method according to International Publication No. WO 04/029062 disclosed by the present applicant.

These metallocene compounds listed above can be used singly or in combinations of two or more.

(Method of Producing Soft Propylene Copolymer (B))

During polymerization, a method of using the compounds and the order of addition are arbitrarily selected. The following methods are exemplified.

Examples thereof include a method in which the compound (I') and the compound (II) are added to a reactor in any order.

In the method described above, at least two of the catalysts may be preliminarily brought into contact with each other.

During polymerization of olefin using such an olefin catalyst for polymerization, the compound (I') is used in an amount of usually $10^{-9}$ to $10^{-1}$ mol, preferably $10^{-8}$ to $10^{-2}$ mol per liter of reaction volume.

The compound (II-1) is used in an amount such that the molar ratio [(II-1)/M] of the compound (II-1) to all the transition metal atoms (M) in the compound (I') is usually 0.01 to 5,000, preferably 0.05 to 2,000. The compound (II-2) is used in an amount such that the molar ratio [(II-2)/M] of the aluminum atom in the compound (II-2) to all the transition metal atoms (M) in the compound (I') is usually 1 to 1,000, preferably 1 to 500. The compound (II-3) is used in an amount such that the molar ratio [(II-3)/M] of the compound (II-3) to all the transition metal atoms (M) in the compound (I') is usually 1 to 10,000, preferably 1 to 5,000.

The soft propylene copolymer (B) is yielded through copolymerization of propylene with at least one olefin (usually in a liquid phase) selected from α-olefins having 2 to 20 carbon atoms (excluding propylene) in the presence of such an olefin catalyst for polymerization. At this time, a hydrocarbon solvent is usually used. α-Olefin may be used as a solvent. Examples of the hydrocarbon solvent specifically include, but should not be limited to, aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbon such as benzene, toluene, and xylene. Copolymerization can also be performed by a batch method or a continuous method.

Examples of the α-olefin which can be used in polymerization, that is, can be polymerized include ethylene, 1-butene, 1-pentene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, and 1-eicosene. These α-olefins can be used singly or in combinations of two or more.

If copolymerization is performed in a batch method using the olefin catalyst for polymerization, the content of the metallocene compound used in the polymerization system is usually 0.00005 to 1 mmol, preferably 0.0001 to 0.50 mmol per liter of polymerization volume.

If the reaction time, that is, the average residence time when copolymerization is performed in a continuous method is usually 5 minutes to 3 hours, preferably 10 minutes to 1.5 hours, although it varies according to the conditions such as the catalyst content and the polymerization temperature.

The propylene and the at least one olefin selected from α-olefins having 2 to 20 carbon atoms (excluding propylene) are fed to the polymerization system in amounts such that a soft propylene copolymer (B) having a specific composition is yielded. A molecular weight adjusting agent such as hydrogen can also be used during copolymerization If propylene and at least one olefin selected from α-olefins having 2 to 20 carbon atoms (excluding propylene) are copolymerized as described above, the soft propylene olefin copolymer is usually yielded as a polymerization solution containing the soft propylene olefin copolymer. This polymerization solution is treated by a normal method to yield a soft propylene copolymer (B).

The copolymerization reaction is performed under the condition at a temperature in the range of usually 40 to 200° C., preferably 40° C. to 180° C., more preferably 50° C. to 150° C. and a pressure in the range of more than 0 to 10 MPa, preferably 0.5 to 10 MPa, more preferably 0.5 to 7 MPa.

Examples of preferred forms of the soft propylene copolymer (B) can include propylene•butene•ethylene copolymer (B1) and propylene•ethylene copolymer (B2) below.

The propylene•butene•ethylene copolymer (B1) contains 55 to 90 mol %, preferably 55 to 87 mol % of the structural unit derived from propylene, 3 to 43 mol %, preferably 10 to 30 mol % of the structural unit derived from 1-butene, and 2 to 42 mol %, preferably 3 to 35 mol % of the structural unit derived from ethylene in the soft propylene copolymer (B) described above.

The propylene•butene•ethylene copolymer (B1) having such a composition has good compatibility with the isotactic propylene polymer (A1).

The propylene•ethylene copolymer (B2) contains 55 to 90 mol %, preferably 60 to 85 mol % of the structural unit derived from propylene and 10 to 45 mol %, preferably 15 to 40 mol % of the structural unit derived from ethylene in the soft propylene copolymer (B) described above.

The propylene•ethylene copolymer (B2) having such a composition has good compatibility with the syndiotactic propylene polymer (A2).

Polyolefin (C) Containing Structural Unit Derived from an Unsaturated Carboxylic Acid and/or a Derivative Thereof The polyolefin (C) is yielded through modification of polyolefin with an unsaturated carboxylic acid and/or a derivative thereof, and contains the structural unit derived from the unsaturated carboxylic acid and/or the derivative thereof.

Examples of the polyolefin to be modified can include polypropylene (c1), ethylene•propylene•α-olefin copolymer (c2), and ethylene•α-olefin copolymer (c3).

These polyolefins (C) may be used singly or as a mixture thereof. For example, the polyolefin (C) may be one of modified products of the polypropylene (c1), modified products of the ethylene•propylene•α-olefin copolymer (c2), and modified products of the ethylene•α-olefin copolymer (c3), or may be a mixture thereof.

The polypropylene (c1) may be a homopolymer of propylene and/or a propylene•α-olefin copolymer, for example. Examples of the α-olefin include, but should not be limited to, preferably ethylene and α-olefins having 4 to 20 carbon atoms. These α-olefins may be used singly or in combinations of two or more. Preferred α-olefins are ethylene and α-olefins having 4 to 10 carbon atoms. Among these, particularly suitable are ethylene and α-olefins having 4 to 8 carbon atoms. Here, the content of the structural unit derived from propylene in the propylene•α-olefin copolymer is at least 50 mol % or more and less than 100%.

The polypropylene component (c1) preferably has a intrinsic viscosity [η] of 0.1 to 10 dl/g. A intrinsic viscosity [η] in this range can attain a composition having high molding properties and mechanical strength.

Examples of the method of producing the polypropylene (c1) include, but should not be particularly limited to, a known method in the presence of a known catalyst such as a Ziegler-Natta catalyst or a metallocene catalyst.

The polypropylene (c1) is preferably a crystalline polymer. If the polypropylene (c1) is a copolymer, it may be a random copolymer or may be a propylene impact copolymer. Furthermore, the polypropylene (c1) may have any stereoregularity and any molecular weight without limitation as long as it satisfies the molding properties and has sufficient strength when molded products thereof are produced. A commercially available resin can also be used as it is.

The polypropylene (c1) is a homopolypropylene or a propylene•α-olefin random copolymer, for example. The polypropylene (c1) may also contain several different isotactic polypropylenes.

The ethylene•propylene•α-olefin copolymer (c2) is specified by the following requirements (i) and (ii), for example:

(i) The structural unit derived from propylene is contained at 45 to 90 mol % of, the structural unit derived from ethylene is contained at 10 to 25 mol %, and the structural unit derived from an α-olefin having 4 to 20 carbon atoms is contained at 1 to 30 mol %; and
(ii) The intrinsic viscosity [η] at 135° C. in decalin is in the range of 0.1 to 10 dl/g.

As the α-olefin, α-olefins having 4 to 10 carbon atoms can be suitably used. These α-olefins having 4 to 10 carbon atoms may be used singly or in combinations or two or more.

The proportions of the structural units derived from the monomers propylene, ethylene, and α-olefin are preferably 50 to 85 mol %, 10 to 22 mol %, and 5 to 28 mol %, respectively. The proportions thereof are more preferably 55 to 80 mol %, 10 to 20 mol %, and 10 to 28 mol %, respectively.

In the requirement (ii), the intrinsic viscosity [η] is in the range of more preferably 0.5 to 8, still more preferably 0.8 to 6. A intrinsic viscosity [η] in this range can attain an adhesive having a good balance between the flexibility and the mechanical strength and having high adhesive strength.

The ethylene•propylene•α-olefin copolymer (C2) can be produced by any known method in the presence of a known catalyst such as a Ziegler-Natta catalyst or a metallocene catalyst.

The ethylene•propylene•α-olefin copolymer (C2) can have any stereoregularity and any molecular weight as long as it satisfies the molding properties and has sufficient strength when molded articles are produced. A commercially available resin can also be used as it is.

The ethylene•α-olefin copolymer component (c3) is specified by the following requirements (iii) and (iv):
(iii) The structural unit derived from ethylene is contained at 50 to 99 mol % and the structural unit derived from α-olefin having 3 to 20 carbon atoms is contained at 1 to 50 mol %.
(iv) The intrinsic viscosity [η] at 135° C. in decalin is in the range of 0.1 to 10 dl/g.

As the α-olefin, α-olefins having 3 to 10 carbon atoms are more suitable. These α-olefins having 3 to 10 carbon atoms may be used singly or in combinations of two or more. The proportions of the structural units derived from the monomers ethylene and α-olefin are preferably 55 to 98 mol % and 2 to 45 mol %, respectively, more preferably 60 to 95 mol % and 5 to 40 mol %, respectively.

In the requirement (iv), the intrinsic viscosity [η] is in the range of more preferably 0.5 to 8, still more preferably, 0.8 to 6. A intrinsic viscosity [η] in this range can attain a composition having a good balance between the flexibility and the mechanical strength and having high adhesive strength.

Examples of the method of producing ethylene•α-olefin copolymer (c3) include, but should not be particularly limited to, a known method in the presence of a known catalyst such as a Ziegler-Natta catalyst or a metallocene catalyst.

The ethylene•α-olefin copolymer (c3) can have any stereoregularity and any molecular weight as long as it satisfies the molding properties and has sufficient strength during production of molded articles. A commercially available resin can also be used as it is for the ethylene•α-olefin copolymer (c3).

Examples of the unsaturated carboxylic acids and/or derivatives thereof used for modification of these polyolefins can include unsaturated compounds having one or more carboxylic groups, esters of compounds having a carboxylic group and alkyl alcohols, and unsaturated compounds having one or more anhydrous carboxylic group. Examples of the unsaturated groups contained in the unsaturated compounds can include a vinyl group, a vinylene group, and an unsaturated cyclic hydrocarbon group. These unsaturated carboxylic acids and/or derivatives thereof can be used singly or in combinations of two or more. Among these, suitable are unsaturated dicarboxylic acids or acid anhydrides thereof, and particularly preferred are maleic acid, nadic acid, or acid anhydrides thereof.

The content of the structural unit derived from an unsaturated carboxylic acid and/or a derivative thereof contained in the polyolefin (C) is preferably 0.01 to 5% by mass, more preferably 0.05 to 3.5% by mass in terms of the structural unit derived from maleic anhydride. A content of the structural unit derived from an unsaturated carboxylic acid and/or a derivative thereof in this range can provide a resin composition having a good balance between the molding properties and the adhesiveness.

In the polyolefin (C), the content proportion of the structural unit derived from propylene in the structural units of the polyolefin (C) excluding the structural unit derived from sn unsaturated carboxylic acid and/or a derivative thereof is preferably 90 to 100 mol %, more preferably 95 to 100 mol %. A content proportion of the structural unit derived from propylene in this range can provide a resin composition having a heat resistance.

The unsaturated carboxylic acid and/or a derivative thereof can be grafted by any method, and a conventionally known graft reaction method such as a solution method or a melt kneading method can be used without limitation in particular. Examples thereof include a method of melting polyolefin, adding an unsaturated carboxylic acid and/or a derivative thereof thereto to perform a graft reaction; or a method of dissolving polyolefin in a solvent to prepare a solution, and adding an unsaturated carboxylic acid and/or a derivative thereof to perform a graft reaction.

Other Components

The polypropylene resin composition according to the present invention may appropriately contain propylene-ethylene block copolymers, propylene homopolymers, propylene-ethylene random copolymers, propylene-ethylene-butene random copolymers, or styrene elastomers having different compositions from that of the present invention in the range not impairing the advantageous effects of the present invention.

Besides, the polypropylene resin composition according to the present invention may contain known additives such as antioxidants, ultraviolet absorbing agents, neutralizers, nucleating agents, light stabilizers, antistatic agents, anti-blocking agents, lubricants, odor adsorbents, antibacterial agents, pigments, inorganic and organic fillers, and a variety of synthetic resins when necessary. Polypropylene resin composition The propylene resin composition according to the present invention can be produced by a known conventional method. For example, the components described above can be melt kneaded to produce the propylene resin composition.

The contents of the propylene polymer (A), the soft propylene copolymer (B), and the polyolefin (C) in the propylene resin composition according to the present invention are preferably 50 to 85 parts by mass, 5 to 40 parts by mass, and 0.1 to 10 parts by mass, respectively, relative to 100 parts by mass of the total content of the propylene polymer (A), the soft propylene copolymer (B), and the polyolefin (C). The contents thereof are more preferably 65 to 85 parts by mass, 10 to 30 parts by mass, and 2 to 5 parts by mass, respectively, relative to 100 parts by mass of the total content of the propylene polymer (A), the soft propylene copolymer (B), and the polyolefin (C). If the propylene resin composition according to the present invention contains the components described above in amounts in this range, a film comprising a layer formed of this composition is more barely whitened during deformation processing.

Monolayer Film or Multilayer Film

The monolayer film and the multilayer film according to the present invention is a monolayer film or a multilayer film comprising at least one layer comprising the polypropylene resin composition. In other words, the monolayer film according to the present invention is a film composed of a layer comprising the polypropylene resin composition, and the multilayer film is a multilayer film comprising at least one layer comprising the polypropylene resin composition.

The monolayer film and the multilayer film according to the present invention have high whitening resistance during deformation processing. Accordingly, if the monolayer film and the multilayer film according to the present invention are used as packaging materials for food products, construction materials, and packaging materials for lithium ion batteries, these films are barely whitened during secondary processing (such as deep drawing or bending) of the films. For this reason, the monolayer film and the multilayer film according to the present invention can be suitably used as packaging materials for food products, construction materials, and batteries.

In particular, although polypropylene resins have been used as a packaging material for lithium ion batteries, the present invention has implemented the prevention of whitening of the packaging material, which has not been prevented by the conventional polypropylene resins, by use of a specific combination comprising the propylene polymer (A), the soft propylene copolymer (B), and the polyolefin (C) described above.

The multilayer film according to the present invention comprises at least one layer comprising the polypropylene resin composition, and further one or both surfaces of the layer comprising the composition are in contact with (a) different layer(s) contained in the multilayer film. Examples of the different layer in contact with the layer comprising the composition can include metal containing layers, polyolefin layers, and polar resin layers. Examples of the metal containing layer can include aluminum layers, copper layers, and stainless steel layers. Examples of the polyolefin layer can include polypropylene layers, poly-4-methylpentene layers, and polyethylene layer. Examples of the polar resin layer can include polyamide layers, EVOH layers, PET layers, and PBT layers.

The monolayer film and the multilayer film according to the present invention can be prepared through melt extrusion molding, and can be generally produced by a method industrially used, such as casting, blown, or extrusion coating.

EXAMPLES

Hereinafter, the present invention will be more specifically described by way of Examples and Comparative Examples, but these Examples should not be construed as any limitation to the present invention without departing the gist of the present invention.

(Methods for Measurement)

In Examples, measurements were performed according to the following methods.

[Melt Flow Rate (MFR)]

The melt flow rate was measured at 230° C. under a load of 2.16 kg according to ASTM D1238.

[Intrinsic Viscosity [η]]

The intrinsic viscosity [η] was measured according to ASTM D1601.

[Evaluation of Whitening Resistance after Drawing]

(Normal Drawing)

Multilayer films for evaluation of whitening resistance (polypropylene layer/adhesive layer/aluminum layer) prepared in Examples and Comparative Examples were drawn at a rate of 200 mm/min using a metal mold having an intermeshing depth of 5 mm. The degree of whitening generated on wall surfaces of the resulting molded articles was visually evaluated according to the following criteria:

A: No whitening
B: Slightly whitened
C: Remarkably whitened (Deep Drawing)

Multilayer films for evaluation of whitening resistance (polypropylene layer/adhesive layer/aluminum layer) prepared in Examples and Comparative Examples were deep drawn at a rate of 200 mm/min using a metal mold having an intermeshing depth of 10 mm. The degree of whitening generated on wall surfaces of the resulting molded articles was visually evaluated according to the following criteria:

A: The molded article has a degree of whitening equal to the degree of whitening as that of the normal drawing.
C: The molded article has a degree of whitening higher than the degree of whitening as that of the normal drawing.

(High-Speed Drawing)

Multilayer films for evaluation of whitening resistance (polypropylene layer/adhesive layer/aluminum layer) prepared in Examples and Comparative Examples were deep drawn at a rate of 400 mm/min using a metal mold having an intermeshing depth of 5 mm. The degree of whitening generated on wall surfaces of the resulting molded articles was visually evaluated according to the following criteria:

A: The molded article has a degree of whitening equal to the degree of whitening as that of the deep drawing at normal speed.
C: The molded article has a degree of whitening higher than the degree of whitening as that of the deep drawing at normal speed.

[Adhesive Strength]

Multilayer films for measurement of adhesive strength (aluminum layer/adhesive layer/aluminum layer) prepared in Examples and Comparative Examples were cut into a width of 20 mm, and the adhesive strength (unit: N/20 mm) between the aluminum layer and the adhesive layer was measured at room temperature (23° C.) using a tensile tester by a 180° peeling method. The crosshead speed was 200 mm/min.

[Polymer Composition]

The contents of structural unit derived from propylene and the structural unit derived from α-olefin in the propylene copolymer were measured by $^{13}$C-NMR using the following apparatus on the following conditions.

The contents of the propylene and the α-olefin were quantitated using a JECX400P nuclear magnetic resonance apparatus made by JEOL, Ltd. Measurement was performed using a mixed solvent of ortho-dichlorobenzene-d6/benzene-d6 (80/20 volume %) as a solvent (sample content: 60 mg/0.6 mL, measurement temperature of 120° C., observation nuclear: $^{13}$C (100 MHz), sequence: single pulse proton decoupling, pulse width: 4.62 µs (45° pulse), repetition time: 5.5 seconds, the number of accumulation: 8000 times, reference value of the chemical shift: 29.73 ppm).

[Melting Point (Tm), Glass Transition Temperature (Tg)]

The melting point (Tm) and the glass transition temperature (Tg) were measured with a DSC220C apparatus made by Seiko Instruments Inc. as a differential scanning calorimeter (DSC). A sample (5 to 10 mg) was sealed in an aluminum pan, which was used as a sample. In the temperature profile, the sample was heated from room temperature to 230° C. at 50° C./min, and was kept at 230° C. for five minutes. The sample was then cooled to −80° C. at 10° C./min, and was kept at −80° C. for five minutes, followed by further heating to 230° C. at 10° C./min. From the chart during the second heating operation, the melting point (Tm) and the glass transition temperature (Tg) were obtained.

[Molecular Weight (Mn, Mw), Molecular Weight Distribution (Mw/Mn)]

The molecular weight and molecular weight distribution of the polymer were measured with a liquid chromatograph (made by Alliance/GPC2000 made by TA Instruments-Waters LLC) including two TSKgelGMH6-HT columns and two TSKgelGMH6-HTL columns (made by Tosoh Corporation, both having a column size having a diameter of 7.5 mm and a length of 300 mm) connected in series. The mobile phase medium used was o-dichlorobenzene and the antioxidant used was BHT (Takeda Pharmaceutical Company Limited, 0.025% by mass). The measurement was performed at a sample content of 0.15% (V/W), a flow rate of 1.0 mL/min, and 140° C. Standard polystyrenes having molecular weights of 500 to 20,600,000 made by Tosoh Corporation were used. The obtained chromatogram was analyzed with data processing software Empower2 made by TA Instruments-Waters LLC according to a known method from a calibration curve using standard polystyrene samples to calculate Mn, Mw, and Mw/Mn.

(Polyolefins Used)

The polyolefins used in Examples and Comparative Examples are shown below. Unless otherwise specified, all of the polyolefins were prepared through polymerization according to a normal method.

Propylene Polymer (A)

PP-1: random polypropylene
(propylene: 96 mol %, ethylene: 4 mol %, [η]: 2.0, Tm: 140° C.)

Soft Propylene Copolymer (B)

PEBR-1: syndiotactic ethylene•propylene•α-olefin copolymer synthesized in Synthetic Example 1 below
(structural unit derived from ethylene: 10 mol %, structural unit derived from propylene: 62 mol %, structural unit derived from butene: 28 mol %, [η]: 2.1 dl/g)

Polyolefin (C)

modified PP-1: modified homopolypropylene
(maleic anhydride graft amount: 3.0% by mass, [η]: 0.4)

Other polymers

PEBR-2: isotactic ethylene•propylene•α-olefin copolymer (structural unit derived from ethylene: 13 mol %, structural unit derived from propylene: 68 mol %, structural unit derived from butene: 19 mol %, [η]: 1.9)

EPR-1: ethylene•propylene copolymer
(structural unit derived from ethylene: 80 mol %, structural unit derived from propylene: 20 mol %, [η]: 1.9)

Synthetic Example 1

[Synthesis of syndiotactic ethylene.propylene.α-olefin copolymer (PEBR 1)]

Dry hexane (833 mL), 1-butene (120 g), and triisobutylaluminum (1.0 mmol) were placed into a 2000 mL polymerization apparatus sufficiently purged with nitrogen at normal temperature, and the inner temperature of the polymerization apparatus was raised to 65° C. The polymerization apparatus was pressurized with propylene to 0.33 MPa, and then with ethylene to 0.62 MPa. Subsequently, di-(p-chlorophenyl)methylene(cyclopentadienyl) (octamethyloctahydrodibenzofluorenyl)zirconium dichloride and a solution of methylaluminoxane in toluene (made by Tosoh Finechem Corporation) were mixed to prepare a toluene solution containing aluminum atom and zirconium atom (molar ratio of aluminum atom/zirconium atom: 300/1). In the next step, an aliquot containing 0.002 mmol of zirconium atom (thus, 0.6 mmol of aluminum atom) was extracted from the toluene solution, was added to the apparatus, and was polymerized for 20 minutes while the inner temperature was kept 65° C. and the inner pressure of the system was kept at 0.62 MPa with ethylene. Methanol (20 mL) was added to stop polymerization. After depressurization, a polymer from polymerization solution was precipitated in 2 L of methanol, and was vacuum dried at 130° C. for 12 hours. 73 g of polymer was yielded.

The polymer had a composition comprising 10 mol % of the structural unit derived from ethylene, 62 mol % of the structural unit derived from propylene, and 28 mol % of the structural unit derived from 1-butene. Tm was not observed. Tg was −17° C., MFR(230° C.) was 1.2 g/10 min, Mw/Mn was 2.0, and [η] was 2.1 dl/g.

Example 1

PP-1 (60.5 parts by mass), PEBR-1 (20 parts by mass), modified PP-1 (4.5 parts by mass), and EPR-1 (15 parts by mass) were melt kneaded at 230° C. using a single screw extruder to prepare a composition. This composition was defined as Adhesive 1.

A commercially available polypropylene (F329RA made by Prime Polymer Co., Ltd., MFR: 24) and Adhesive 1 were co-extruded at 290° C. with a screw having a diameter of 50 mm and an effective length L/D of 28. The extruded polypropylene and the adhesive were laminated in a feed block such that polypropylene formed an outer layer and the adhesive formed an inner layer, to prepare a laminate (thickness: 40 µm) in the form of a film including the outer layer and the inner layer both having a thickness of 20 µm. The die temperature was 290° C. The melt laminate was brought into contact with the surface of an aluminum foil (thickness: 20 µm), and was drawn at a rate of 50 m/min while being cooled with a chill roll with a pinch roll. A multilayer film for evaluation of whitening resistance (polypropylene layer/adhesive layer/aluminum layer) was thereby prepared.

A film having a thickness of 50 µm was molded from Adhesive 1 with an extrusion molding machine having a T-die. The resulting film was sandwiched between two aluminum foils having a thickness of 300 µm, and was heat sealed with a heat sealer at 160° C. and 0.1 MPa for 5 seconds to prepare a multilayer film for evaluation of adhesive strength (aluminum layer/adhesive layer/aluminum layer).

Example 2, Comparative Examples 1 to 3

In Example 2 and Comparative Examples 1 to 3, compositions were prepared by the same method as in Example 1 according to the compounding formulas shown in Table 1. The composition prepared Example 2 was defined as Adhesive 2, the composition prepared in Comparative Example 1 was defined as Adhesive 3, the composition prepared in Comparative Example 2 was defined as Adhesive 4, and the composition prepared in Comparative Example 3 was defined as Adhesive 5. Multilayer films for evaluation of whitening resistance and multilayer films for evaluation of adhesive strength were prepared using the adhesives as in Example 1.

The MFRs of the adhesives prepared in Examples and Comparative Examples, the evaluation of the whitening resistance of the multilayer films prepared from the adhesives, and the adhesive strengths were shown in Table 1.

TABLE 1

|  |  | Example 1 Adhesive 1 | Example 2 Adhesive 2 | Comparative Example 1 Adhesive 3 | Comparative Example 2 Adhesive 4 | Comparative Example 3 Adhesive 5 |
|---|---|---|---|---|---|---|
| Compounding (part by weight) | PP-1 | 60.5 | 70.5 | 55.5 | 70.5 | 80.5 |
|  | PEBR-1 | 20 | 10 |  |  |  |
|  | PEBR-2 |  |  | 25 | 10 |  |
|  | Modified PP-1 | 4.5 | 4.5 | 4.5 | 4.5 | 4.5 |
|  | EPR-1 | 15 | 15 | 15 | 15 | 15 |
| MFR (g/10 min) |  | 3.9 | 4.9 | 6.0 | 6.4 | 6.5 |
| Whitening resistance | Normal drawing | A | B | B | C | C |
|  | Deep drawing | A | A | A | C | C |
|  | High speed drawing | A | A | C | C | C |
| Adhesive strength |  | 106 | 97 | 96 | 96 | 95 |

The invention claimed is:

1. A polypropylene resin composition, comprising a propylene polymer (A) satisfying the following requirement (a); a soft propylene copolymer (B) satisfying the following requirement (b); and a polyolefin (C) selected from polypropylene and an ethylene propylene α-olefin copolymer and containing a structural unit derived from an unsaturated carboxylic acid and/or a derivative thereof, and having 95 to 100 mol % of a content proportion of the structural unit derived from propylene in the structural units excluding the structural unit derived from the unsaturated carboxylic acid and/or the derivative, wherein
the polyolefin (C) contains 0.05 to 5% by mass of the structural unit derived from an unsaturated carboxylic acid and/or a derivative thereof,
the propylene resin composition contains 2 to 10 parts by mass of the polyolefin (C) (provided that a total of (A), (B), and (C) is 100 parts by mass),
(a) a melting point observed by differential scanning calorimetry is 100° C. or more, and
(b) an MFR measured at 230° C. and a load of 2.16 kg according to ASTM D-1238 is in the range of 0.01 to 100 g/10 min, and at least one of the following requirements (b-1) and (b-2) is satisfied:
(b-1) a syndiotactic triad fraction (rr fraction) measured by $^{13}$C-NMR is 60% or more, and
(b-2) a structural unit derived from propylene is contained at 55 to 90 mol % and a structural unit derived from at least one olefin selected from α-olefins having 2 to 20 carbon atoms (excluding propylene) is contained at 10 to 45 mol % (provided that a total of the structural unit derived from propylene and the structural units derived from α-olefins having 2 to 20 carbon atoms (excluding propylene) is 100 mol %), and relation between a intrinsic viscosity [η] (dL/g) measured at 135° C. in decalin and the MFR (g/10 min, 230° C., load: 2.16 kg) satisfies the relation represented by an expression:

$$1.50 \times MFR^{-0.20} \leq [\eta] \leq 2.65 \times MFR^{-0.20}.$$

2. The polypropylene resin composition according to claim 1, comprising:
50 to 85 parts by mass of the propylene polymer (A); and
5 to 40 parts by mass of the soft propylene copolymer (B) (provided that a total of (A), (B), and (C) is 100 parts by mass).

3. A monolayer film or a multilayer film, comprising at least one layer comprising the polypropylene resin composition according to claim 1.

4. A multilayer film, comprising at least one layer comprising the polypropylene resin composition according to claim 1 and at least two other layers different from the layer comprising the composition, wherein both surfaces of the layer comprising the composition are in contact with the other layers.

5. A multilayer film, comprising at least one layer comprising the polypropylene resin composition according to claim 1 and at least one layer selected from a metal containing layer, a polyolefin layer, and a polar resin layer, wherein the layer comprising the composition is in contact with at least one layer of the metal containing layer, the polyolefin layer, and the polar resin layer.

6. The monolayer film or multilayer film according to claim 3, wherein the film is a film for packaging food products.

7. The monolayer film or multilayer film according to claim 3, wherein the film is a film for a construction material.

8. The monolayer film or multilayer film according to claim 3, wherein the film is a film for packaging batteries.

9. A method of producing a monolayer film or multilayer film, comprising melt extrusion molding the polypropylene resin composition according to claim 1.

10. The polypropylene resin composition according to claim 1, wherein the polyolefin (C) has 100 mol % of a content proportion of the structural unit derived from propylene in the structural units excluding the structural unit derived from the unsaturated carboxylic acid and/or the derivative thereof.

11. The polypropylene resin composition according to claim 1, wherein the polyolefin (C) contains 3.0 to 5% by mass of the structural unit derived from an unsaturated carboxylic acid and/or a derivative thereof.

12. The polypropylene resin composition according to claim 1, wherein the polyolefin (C) has 100 mol % of a content proportion of the structural unit derived from propylene in the structural units excluding the structural unit derived from the unsaturated carboxylic acid and/or the derivative, and the polyolefin (C) contains 3.0 to 5% by mass of the structural unit derived from an unsaturated carboxylic acid and/or a derivative thereof.

* * * * *